US009013484B1

(12) United States Patent
Jakob et al.

(10) Patent No.: US 9,013,484 B1
(45) Date of Patent: Apr. 21, 2015

(54) PROGRESSIVE EXPECTATION-MAXIMIZATION FOR HIERARCHICAL VOLUMETRIC PHOTON MAPPING

(75) Inventors: Wenzel Jakob, Ithaca, NY (US);
Christian Regg, Lucerne (CH);
Wojciech Jarosz, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 255 days.

(21) Appl. No.: 13/487,076

(22) Filed: Jun. 1, 2012

(51) Int. Cl.
*G06T 15/00* (2011.01)
*G06T 15/06* (2011.01)
*G06T 15/50* (2011.01)

(52) U.S. Cl.
CPC ............. *G06T 15/06* (2013.01); *G06T 15/506* (2013.01)

(58) Field of Classification Search
CPC ............................ G06T 15/506; G06T 15/06
USPC ......................................... 345/419, 423, 426
See application file for complete search history.

(56) References Cited

U.S. PATENT DOCUMENTS 8,009,168 B2 * 8/2011 Zhou et al. .................... 345/426
8,638,331 B1 * 1/2014 Jarosz et al. .................. 345/426

OTHER PUBLICATIONS

Chandrasekhar S., *Radiative Transfer.* (1960) Dover Publications, New York.
Christensen P. H., Batali D., An Irradiance Atlas for Global Illumination in Complex Production Scenes. *In Rendering Techniques* (Jun. 2004), pp. 133-142.
Cerezo E., Pérez F., Pueyo X., Seron F. J., Sillion F. X., A survey on participating media rendering techniques. *The Visual Computer,* (Jun. 2005), vol. 21, Issue No. 5, pp. 303-328.
Dempster A., Laird N., Rubin D., et al.: Maximum likelihood from incomplete data via the EM algorithm. *Journal of the Royal Statistical Society.* (1977), vol. 39, Issue No. 1, pp. 1-38.
Dobashi Y., Yamamoto T., Nishita T.: Radiosity for point-sampled geometry. *12th Pacific Conference on Computer Graphics and Applications* (Oct. 2004), pp. 152-159.
Dutré P., Bala K., Bekaert P., *Advanced Global Illumination.* (Aug. 2006), AK Peters Ltd., Natick, MA.
Garcia V., Nielsen F., Nock R., *Hierarchical Gaussian mixture model*, (Jan. 2010).
Goldberger J., Roweis S., Hierarchical Clustering of a Mixture Model. *Advances in Neural Information Processing Systems 17*, (2005), pp. 505-512.

(Continued)

*Primary Examiner* — Phu K Nguyen
(74) *Attorney, Agent, or Firm* — Kilpatrick Townsend & Stockton, LLP

(57) ABSTRACT

State-of-the-art density estimation methods for rendering participating media rely on a dense photon representation of the radiance distribution within a scene. A parametric density estimation technique is used to represent radiance using a hierarchical Gaussian mixture. Coefficients of this mixture are efficiently obtained for use in a progressive and accelerated form of the Expectation-Maximization algorithm. Noise-free renderings of high-frequency illumination are created using only a few thousand Gaussian terms, where millions of photons are traditionally required. Temporal coherence is trivially supported within this framework, and the compact footprint is also useful in the context of real-time visualization. A hierarchical ray tracing-based implementation is demonstrated, as well as a fast splatting approach that can interactively render animated volume caustics.

27 Claims, 10 Drawing Sheets

(56) References Cited

OTHER PUBLICATIONS

Hachisuka T., Ogaki S., Jensen H. W., Progressive Photon Mapping. *ACM Transactions on Graphics*, (Dec. 2008), vol. 27, Issue No. 5, Article No. 130, pp. 130:1-130:8.

Hachisuka T., and Jensen, H.W., Stochastic Progressive Photon Mapping, *ACM Transactions on Graphics* (Dec. 2009), vol. 28, Issue No. 5, Article No. 141, pp. 141:1-141:8.

Hachisuka T., Jarosz W., Jensen H. W.: A Progressive Error Estimation Framework for Photon Density Estimation. *ACM Transactions on Graphics*, (Dec. 2010). vol. 29, Issue No. 6, Article No, 144, pp. 144:1-144:11.

Han C., Sun B., Ramamoorthi R., Grinspun E.: Frequency Domain Normal Map Filtering. *ACM Transactions on Graphics*. (Jul. 2007). vol. 26, No. 3, Article 28, pp. 28:1-28:11.

Hanrahan P., Salzman D., Aupperle L., A Rapid Hierarchical Radiosity Algorithm. *Computer Graphics (Proceedings of SIGGRAPH 91)*, (Jul. 1991), vol. 25, No. 4, pp. 197-206.

Hasan B. A. S., Gan J., Sequential EM for Unsupervised Adaptive Gaussian Mixture Model Based Classifier. *Machine Learning and Data Mining in Pattern Recognition*, (2009), vol. 5632, pp. 96-106.

Havran, V., Bittner, J., Herzog, R., and Seidel, H.P., Ray Maps for Global Illumination. *Rendering Techniques*, Eurographics Symposium on Rendering, (2005), pp. 43-54.

Herzog, R., Havran, V., Kinowaki, S., Myszkowski, K., and Seidel, H.P., Global Illumination Using Photon Ray Splatting. *Computer Graphics Forum*, (Sep. 2007), vol. 26, No. 3, pp. 503-513.

Hopf M., Luttenberger M., Ertl T., Hierarchical Splatting of Scattered 4D Data. *IEEE Computer Graphics and Applications*, (Jul./Aug. 2004), vol. 24, pp. 64-72.

Hopf M., Ertl T., Hierarchical Splatting of Scattered Data. *Proceedings of VIS* (Oct. 19-24, 2003), pp. 433-440.

Wenzel Jakob, Christian Regg, Wojciech Jarosz, Progressive Expectation-Maximization for Hierarchical Volumetric Photo Mapping, *Eurographics Symposium on Rendering 2011*, (2011), vol. 30, No. 4.

Jarosz W., Zwicker M., Jensen H. W., The Beam Radiance Estimate for Volumetric Photon Mapping. *Computer Graphics Forum*, (Apr. 2008), vol. 27, No. 2, pp. 557-566.

Jarosz W., Nowrouzezahrai D., Sadeghi I., Jensen H. W., A Comprehensive Theory of Volumetric Radiance Estimation Using Photon Points and Beams. *ACM Transactions on Graphics*, (Jan. 2011), vol. 30, No. 1, Article 5, pp. 5:1-5:19.

Jensen H. W., Christensen P. H., Efficient Simulation of Light Transport in Scenes With Participating Media Using Photon Maps. *Proceedings of SIGGRAPH.* (Jul. 1998).

Kajiya, J.T., The Rendering Equation. *Computer Graphics (Proceedings of SIGGRAPH 86)*, (Aug. 1986), vol. 20, No. 4, pp. 143-150.

Knaus, C., and Zwicker, M., Progressive Photon Mapping: A Probabilistic Approach. *ACM Transactions on Graphics* (May 2011), vol. 30, No. 3, Article 25, pp. 25:1-25:13.

Lafortune E. P., Willems Y. D., Bi-Directional Path Tracing. *Compugraphics* (Dec. 1993), pp. 145-153.

Lafortune E. P., Willems Y. D., Rendering Participating Media With Bidirectional Path Tracing. *7th Eurographics Rendering Workshop*, (Jun. 1996), pp. 91-100.

Lastra, M., Urena, C., Revelles, J., and Montes, R., A Particle-Path Based Method for Monte Carlo Density Estimation. *Thirteen EuroGraphics Workshop on Rendering*, (2002), EG Association.

Laur D., Hanrahan P., Hierarchical Splatting: A Progressive Refinement Algorithm for Volume Rendering. *Proceedings of SIGGR9PH.* (Jul. 1991), vol. 25, No. 4, pp. 285-288.

Lehtinen J., Zwicker M., Turquin E., Kontkanen J., Durand F., Sillion F. X., Aila.T., A Meshless Hierarchical Representation for Light Transport. *ACM Transactions on Graphics*, (Aug. 2008), vol. 27, No. 3, Article 37, pp. 37:1-37:9.

Neal R., Hinton G., A View of the EM Algorithm That Justifies Incremental, Sparse, and Other Variants. *Learning in Graphical Models*, (1998), pp. 355-368.

Papas M., Jarosz W., Jakob W., Rusinkiewicz S., Matusik W., Weyrich T., Goal-Based Caustics. *Computer Graphics Forum (Proceedings of Eurographics '11)*, (Jun. 2011) vol. 30, No. 2, pp. 503-511.

Pauly M., Kollig T., Keller A., Metropolis Light Transport for Participating Media. *Eurographics Workshop on Rendering* (Jun. 2000), pp. 11-22.

Raab, M., Seibert, D., and Keller, A., Unbiased Global Illumination With Participating Media. *Monte Carlo and Quasi-Monte Carlo Methods 2006.* (2008) Springer, pp. 591-606.

Rusinkiewicz S., Levoy M. Qsplat: A Multi-Resolution Point Rendering System for Large Meshes. *Proceedings of ACM SIGGRAPH.* (Jul. 2000), pp. 343-352.

Schjøth L., Frisvad J. R., Erleben K., Sporring J., Photon Differentials. *Graphite.* (2007), Association for computer Machinery, Inc. pp. 179-186.

Schjøth L., Sporring J., Olsen O. F., Diffusion Based Photon Mapping. *Computer Graphics Forum*, (Dec. 2008), vol. 27, No. 8, pp. 2114-2127.

Sillion F. X., A Unified Hierarchical Algorithm for Global Illumination With Scattering Volumes and Object Clusters. *IEEE Transactions on Visualization and Computer Graphics*, (Sep. 1995), vol. 1, No. 3, pp. 240-254.

Silverman B. W., *Density Estimation for Statistics and Data Analysis.* (1986) Chapman and Hall, New York, NY.

Spencer B., Jones M. W., Hierarchical Photon Mapping. *IEEE Transactions on Visualization and Computer Graphics*, (Jan./Feb. 2009), vol. 15, No. 1, pp. 49-61.

Spencer B., Jones M. W., Into the Blue: Better Caustics Through Photon Relaxation. *Computer Graphics Forum*, (Apr. 2009), vol. 28, No. 2, pp. 319-328.

Sun, X., Zhou, K., Lin, S., and Guo, B., Line Spacing Gathering for Single Scattering in Large Scenes. *Acm Transactions on Graphics.* (Jul. 2010), vol. 29, No. 4, Article 54, pp. 54:1-54:8.

Tan P., Lin S., Quan L., Guo B., Shum H.-Y., Multi-Resolution Reflectance Filtering. *Proceedings Eurographics Symposium on Rendering.* (2005), pp. 111-116.

Veach E., Guibas L., Bidirectional Estimators for Light Transport. *Eurographics Workshop on Rendering* (1994).

Verbeek J. J., Nunnink J. R., Vlassie N., Accelerated EM-Based Clustering of Large Data Sets. *Data Mining and Knowledge Discovery*, (May 2006), vol. 13, pp. 291-307.

Walter B., Fernandez S., Arbree A., Bala K., Donikian M., Greenberg D. P., Lightcuts: A Scalable Approach to Illumination. *ACM Transactions on Graphics.* (Aug. 2005), vol. 24, No. 3, pp. 1098-1107.

Walter B., Arbree A., Bala K., Greenberg D.P., Multidimensional Lightcuts. *ACM Transactions on Graphics.* (2006) vol. 25, No. 3, pp. 1081-1088.

Walter B., Bala K., Kulkarni M., Pingali K., Fast Agglomerative Clustering for Rendering. *IEEE Symposium on Interactive Ray Tracing* (Aug. 2008), pp. 81-86.

Yue, Y., Iwasaki, K., Chen, B.Y., Dobashi, Y., and Nishita, T., Unbiased, Adaptive Stochastic Sampling for Rendering Inhomogeneous Participating Media. *ACM Transactions on Graphics.* (Dec. 2010), vol. 29, No. 6, Article 177, pp. 177:1-177:7.

Zhou K., Hou Q., Gong M., Snyder J., Guo B., Shum H.-Y., Fogshop: Real-Time Design and Rendering of Inhomogeneous, Single-Scattering Media. *Pacific Graphics.* (2007), pp. 116-125.

Zhou K., Ren Z., Lin S., Bao H., Guo B., Shum H.-Y., Real-Time Smoke Rendering Using Compensated Ray Marching. *ACM Transactions on Graphics.* (Aug. 2008), vol. 27, No. 3, Article 36, pp. 36:1-36:12.

Zwicker M., Pfister H., Van Saar J., Gross M., EWA Splitting. *IEEE Transactions on Visualization and Computer Graphics*, (Jul./Sep. 2002), vol. 8, No. 3, pp. 223-238.

\* cited by examiner

*FIG. 1(a)(1)*
917K photons
(13 + 268 = 281 s)
*FIG. 1(a)(2)*
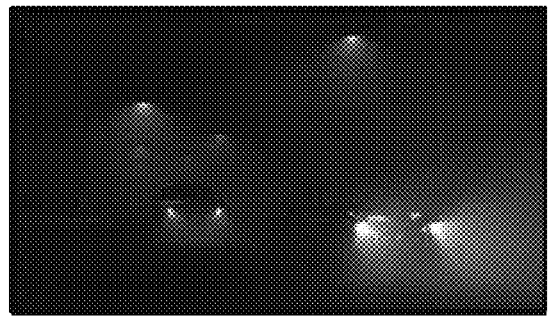
*FIG. 1(b)(1)*
4K Gaussian fit
(54 + 71 = 125 s)
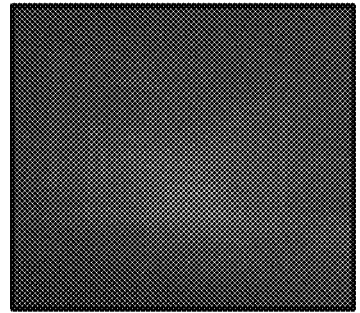
*FIG. 1(b)(2)*

Target density

Initial cut

Initial GMM

Final cut

Final GMM

Hierarchy used
in 4b - 4e

Intersect bounding
box

Criterion 1: small
projected size $T_r < \varepsilon_{T_r}$

Criterion 2: low
transmittance

Otherwise: recurse

FIG. 5(a)(1)
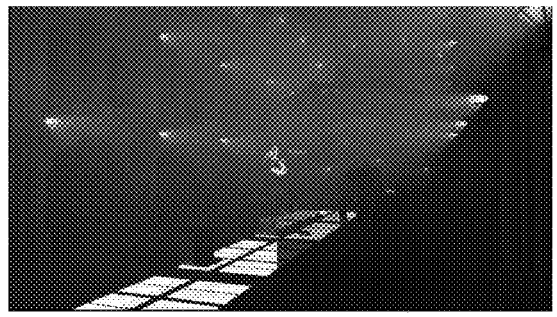
3.6M photons
(133 + 344 = 477 s)
FIG. 5(a)(2)
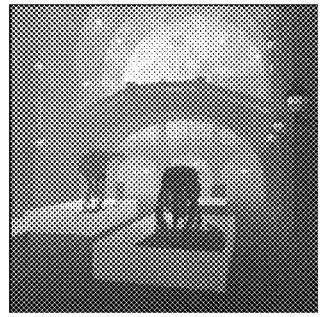
FIG. 5(b)(1)
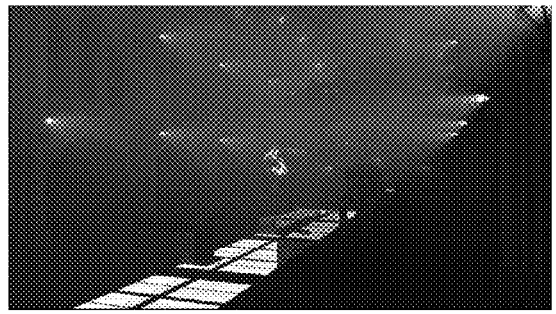
16K Gaussian fit
(226 + 100 = 326 s)
FIG. 5(b)(2)
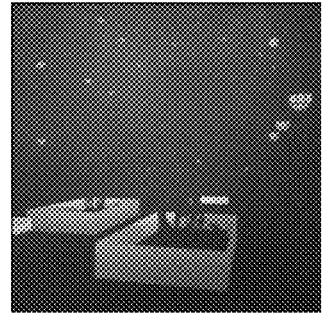

(1) 294K photons (6 + 126 = 132 s)
(2) 1.0M photons (23 + 192 = 215 s)
(3) 4.7M photons (109 + 337 = 446 s)
(4) 18M photons (507 + 609 = 1116 s)

(1) 1K Gaussians (7 + 15 = 22 s)
(2) 4K Gaussians (35 + 24 = 59 s)
(3) 16K Gaussians (184 + 39 = 223 s)
(4) 64K Gaussians (868 + 66 = 934 s)

FIG. 7(a)(1)
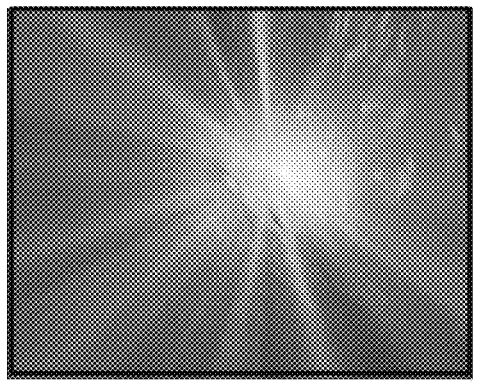
(73 + 195 = 268 s)
FIG. 7(a)(2)
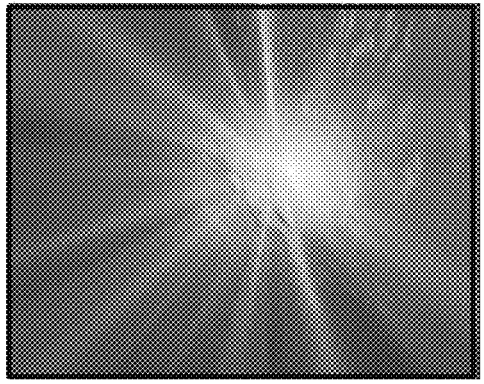
(178 + 40 = 218 s)
FIG. 7(b)(1)
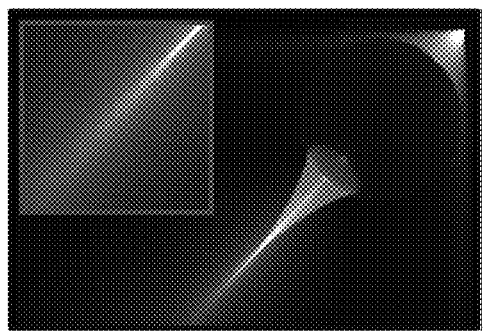
(89 + 638 = 727 s)
FIG. 7(b)(2)
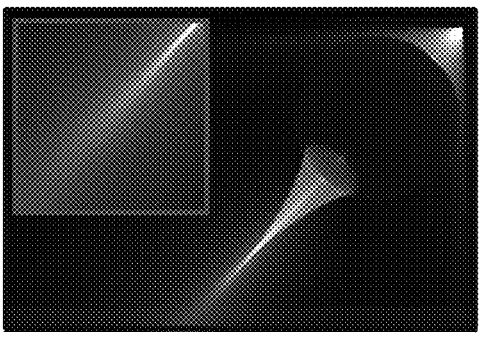
(330 + 127 = 457 s)

|  |  |  |  | BRE [Jarosz et al. 2008] | | | Our Method | | |
| --- | --- | --- | --- | --- | --- | --- | --- | --- | --- |
| Scene | k | n | \|P\| | EM iter. | Preprocess | Render | Total | Preprocess | Render | Total |
| FIG. 1(B)(1) | 4K | 917,504 | 87,615 | 12 | 13.48 s | 268.20 s | 281.69 s | 54.43 s | 71.21 s (3.8×) | 125.64 s (2.2×) |
| FIG. 5(B)(1) | 16K | 3,670,016 | 381,602 | 10 | 133.90 s | 343.95 s | 477.89 s | 225.73 s | 100.39 s (3.4×) | 326.12 s (1.7×) |
| FIG. 6(B)(1) | 1K | 294,912 | 30,264 | 19 | 5.73 s | 126.35 s | 132.08 s | 6.81 s | 15.19 s (8.3×) | 22.00 s (6.0×) |
| FIG. 6(B)(2) | 4K | 1,085,621 | 121,910 | 19 | 23.46 s | 192.30 s | 215.76 s | 35.13 s | 24.52 s (7.8×) | 59.65 s (3.6×) |
| FIG. 6(B)(3) | 16K | 4,718,592 | 489,602 | 20 | 109.30 s | 337.42 s | 446.72 s | 184.06 s | 39.35 s (8.6×) | 223.41 s (2.0×) |
| FIG. 6(B)(4) | 64K | 18,874,368 | 1,961,891 | 19 | 507.30 s | 609.25 s | 1116.55 s | 868.48 s | 66.03 s (9.2×) | 934.51 s (1.2×) |
| FIG. 7(A)(2) | 16K | 4,718,592 | 485,339 | 18 | 73.47 s | 195.46 s | 268.93 s | 178.25 s | 40.67 s (4.8×) | 218.92 s (1.2×) |
| FIG. 7(B)(2) | 16K | 4,194,304 | 458,366 | 11 | 89.55 s | 638.39 s | 727.90 s | 329.83 s | 127.30 s (5.0×) | 457.13 s (1.6×) |

*FIG. 8*

| Symbol | Description |
| --- | --- |
| $\{x_i\}_1^n$ | Photon positions used in the EM fit |
| $i$ | Index for photons |
| $n$ | Total number of photons |
| $p(x)$ | True probability density of photon positions |
| $p(x\|\Theta)$ | Probability density of GMM approximating $p(x)$ |
| $g(x\|\Theta_s)$ | Gaussian density at x of GM component $s$ |
| $\Theta_s$ | Weight, mean, and covariance matrix ($w_s, \mu_s, \Sigma_s$) of component $s$ |
| $\Theta$ | Set of all mixture model parameters $\{\Theta_s\}_1^k$ |
| $s$ | Index for GMM components |
| $k$ | Number of GMM components |
| $\mathcal{L}(\Theta)$ | Log-likelihood function defined in (6) |
| $\mathcal{F}(\Theta, q)$ | Lower bound on the likelihood function, see (8) |
| $q_i(s)$ | Responsibility of point $i$ for GMM component $s$ |
| $q_A(s)$ | Responsibility of cell $A$ for GMM component $s$ |
| $n_A$ | Number of points $x_i$ that fall within A |
| $(..)_A$ | Average of the quantity .. w.r.t. the points $x_i \in A$ |
| $\overline{\Theta}_j$ | Parameters ($\overline{w}_j, \overline{\mu}_j, \overline{\Sigma}_s$) of GMM pyramid component $j$ |
| $j$ | Index into GMM pyramid nodes |

*FIG. 9*

PROGRESSIVE EXPECTATION-MAXIMIZATION FOR HIERARCHICAL VOLUMETRIC PHOTON MAPPING

BACKGROUND

Computer-generated imagery typically involves using software and/or hardware to generate one or more images from a geometric model. A geometric model defines objects, light sources, and other elements of a virtual scene and a rendering system or other computer/software/hardware system will read in the geometric model and determine what colors are needed in what portions of the image. A renderer will generate a two-dimensional ("2D") or three-dimensional ("3D") array of pixel color values that collectively result in the desired image or images.

For a simple geometric model, such as a cube in a vacuum with a single light source, a simple computer program running on most computer hardware could render the corresponding image in a reasonable amount of time without much optimization effort. However, there are many needs—in the entertainment industry and beyond—for methods and apparatus that can efficiently process complex interactions of virtual objects to generate imagery in constrained timeframes where the images might need to convey realistic light interactions, such as light interacting with a participating medium.

Examples of such interaction include the scattering of light, which results in visual complexity, such as when the light interacts with participating media such as clouds, fog, and even air. Rendering this complex light transport typically involves solving a radiative transport equation (see, e.g., [Chandrasekar]) combined with a rendering equation (see, e.g., [Kajiya]) as a boundary condition. Other light interactions might include light passing through objects, such as refractive objects.

Rendering preferably involves computing unbiased, noise-free images. Unfortunately, the typical options to achieve this are variants of brute force path tracing (see, e.g., [Kajiya], [Lafortune93], [Veach], [Lafortune96]) and Metropolis light transport (see, e.g., [Veach], [Pauly]), are notoriously slow to converge to noise-free images despite recent advances (see, e.g., [Raab; Yue]). This becomes particularly problematic when the scene contains specular-diffuse-specular ("SDS") subpaths or specular-media-specular ("SMS") subpaths, which are common in physical scenes. These SDS or SMS subpaths may result from diffused reflections and/or refractions of light from a direct light source, giving a scene a realistic, ambient illumination. For example, in a room with a light bulb hanging from the ceiling being the direct light source, light from the light bulb is also reflected off the walls of the room and object surfaces in the room, or light may travel through mediums, such as a glass of water, thus creating SDS and SMS subpaths. The SDS/SMS properties might be used for scenes where there is illumination due to a light source inside a glass fixture or complex light paths, as might be the case with caustics that create light patterns on the bottom of a swimming pool as a result of light shining through the water. Unfortunately, path tracing methods cannot robustly handle these situations, especially in the presence of small light sources.

Methods based on volumetric photon mapping do not suffer from these problems (see, e.g., [Jensen]). They can robustly handle SDS and SMS subpaths, and generally produce less noise. However, these methods suffer from bias. Bias can be eliminated, in theory, by using infinitely many photons, but in practice this is not feasible since tracking infinitely many photons requires unlimited memory.

Volumetric photon mapping is an approach to dealing with light in a participating medium, which is described in [Jensen]. [Jarosz08] describes an improvement to avoid costly and redundant density queries due to ray marching. In those approaches, a renderer formulates a "beam radiance estimate" that considers all photons along the length of a ray in one query. For example, [Jarosz11] showed how to apply the beam concept not just to the query operation but also to the photon data representation. In that approach, the entire photon path is used instead of just photon points, to obtain significant quality and performance improvement. This is similar in spirit to the concept of ray maps for surface illumination (see, e.g., [Lastra], [Havran], [Herzog]), as well as the recent line-space gathering technique (see, e.g., [Sun]). Those methods result in bias, which allows for more efficient simulation; however, when the majority of the illumination is due to caustics (which is often the case with realistic lighting fixtures or when there are specular surfaces), the photons are visualized directly and a large number is required to obtain high-quality results. Though these methods converge to an exact solution as the number of photons increases, obtaining a converged solution requires storing an infinite collection of photons, which is not feasible.

Progressive photon mapping, as shown in, for example, [Hachisuka08], alleviates this memory constraint. Instead of storing all photons needed to obtain a converged result, it updates progressive estimates of radiance at measurement points in the scene (see, e.g., [Hachisuka08], [Hachisuka09]) or on the image plane (see, e.g., [Knaus]). Photons are traced and discarded progressively, and the radiance estimates are updated after each photon tracing pass in such a way that the approximation converges to the correct solution in the limit.

Previous progressive techniques have primarily focused on surface illumination, but [Knaus] demonstrated results for the traditional volumetric photon mapping as in [Jensen]. Unfortunately, volumetric photon mapping with photon points produces inferior results compared to photon beams as explained by [Jarosz11], especially in the presence of complex specular interactions that benefit most from progressive estimation.

Light interactions in participating media are responsible for many subtle but rich lighting effects in fire, water, smoke, clouds and crepuscular rays. Unfortunately, accurately rendering these effects is very costly. [Cerezo] provides a comprehensive overview of recent techniques.

Though methods such as (bidirectional) path tracing (see, e.g., [Lafortune93], [Veach], [Lafortune96]) or Metropolis light transport (see, e.g., [Pauly]) are general and provide unbiased solutions, it is costly to obtain high-quality, noise-free solutions except in the simplest scenes. The most successful approaches typically combine photon tracing with a biased Monte Carlo framework (see, e.g., [Jensen], [Walter06], [Jarosz08]).

Volumetric photon mapping traces paths from light sources and stores "photons" at the vertices of these paths (see, e.g., [Jensen]). A subsequent rendering pass approximates lighting using density estimation of the photons. The recent beam radiance estimate (BRE), as shown in [Jarosz08], for photon mapping further accelerates this approach and improves the rendering quality by accounting for all photons that are located along a ray query.

However, even with such state-of-the-art optimizations, photon mapping suffers from a few remaining sources of inefficiency: 1) complex high-frequency lighting requires an excessive number of photons, which increases memory demands and leads to slow rendering times; 2) many photons may be processed which ultimately contribute very little to the final pixel color (due to subsequent attenuation or small projected pixel size); and 3) since photons are generated stochastically, the reconstructed density is prone to flickering unless many photons are used.

Thus, even with those techniques, improvements to existing rendering techniques are needed.

REFERENCES

Chandrasekhar S.: *Radiative Transfer*. Dover Publications, New York, 1960.

Christensen P. H., Batali D.: An irradiance atlas for global illumination in complex production scenes. In *Rendering Techniques* (June 2004), pp. 133-142.

Cerezo E., Perez F., Pueyo X., Seron F. J., Sillion F. X.: A survey on participating media rendering techniques. *The Visual Computer* 21, 5 (2005).

Dempster A., Laird N., Rubin D., et al.: Maximum likelihood from incomplete data via the EM algorithm. *Journal of the Royal Statistical Society.* 39, 1 (1977), 1-38.

Dobashi Y., Yamamoto T., Nishita T.: Radiosity for point-sampled geometry. In *12th Pacific Conference on Computer Graphics and Applications* (October 2004), pp. 152-159.

Dutré P., Bala K., Bekaert P.: *Advanced global illumination*. AK Peters Ltd, 2006.

Garcia V., Nielsen F., Nock R.: Hierarchical Gaussian mixture model.

Goldberger J., Roweis S.: Hierarchical clustering of a mixture model. *Advances in Neural Information Processing Systems* 17, 505-512 (2005), 2-4.

Hachisuka T., Ogaki S., Jensen H. W.: Progressive photon mapping. *ACM Transactions on Graphics* 27, 5 (December 2008), 130:1-130:8.

Hachisuka T., and Jensen, H. W.: Stochastic progressive photon mapping, *ACM Transactions on Graphics* (December 2009).

Hachisuka T., Jarosz W., Jensen H. W.: A progressive error estimation framework for photon density estimation. *ACM Transactions on Graphics.* 29 (December 2010).

Han C., Sun B., Ramamoorthi R., Grinspun E.: Frequency domain normal map filtering. *ACM Transactions on Graphics.* 26, 3 (2007).

Hanrahan P., Salzman D., Aupperle L.: A rapid hierarchical radiosity algorithm. In *Computer Graphics (Proceedings of SIGGRAPH* 91) (July 1991), pp. 197-206.

Hasan B. A. S., Gan J.: Sequential EM for unsupervised adaptive Gaussian mixture model based classifier. In *Machine Learning and Data Mining in Pattern Recognition*, vol. 5632. 2009, pp. 96-106.

Havran, V., Bittner, J., Herzog, R., and Seidel, H. P.: Ray maps for global illumination. In *Rendering Techniques*, (2005), pp. 43-54.

Herzog, R., Havran, V., Kinowaki, S., Myszkowski, K., and Seidel, H. P.: Global illumination using photon ray splatting. *Computer Graphics Forum* 26, 3 (September 2007), pp. 503-513.

Hopf M., Luttenberger M., Ertl T.: Hierarchical splatting of scattered 4d data. *IEEE Computer Graphics and Applications* 24 (July 2004), 64-72.

Hopp M., Ertl T.: Hierarchical splatting of scattered data. In *Proceedings of VIS* (2003).

Jarosz W., Zwicker M., Jensen H. W.: The beam radiance estimate for volumetric photon mapping. *Computer Graphics Forum* 27, 2 (April 2008).

Jarosz W., Nowrouzezahrai D., Sadeghi I., Jensen H. W.: A comprehensive theory of volumetric radiance estimation using photon points and beams. *ACM Transactions on Graphics* 30, 1 (January 2011), 5:1-5:19.

Jensen H. W., Christensen P. H.: Efficient simulation of light transport in scenes with participating media using photon maps. In *Proceedings of SIGGRAPH.* (July 1998).

Kajiya, J. T.: The rendering equation. In *Computer Graphics (Proceedings of SIGGRAPH* 86) (1986), pp. 143-150.

Knaus, C., and Zwicker, M.: Progressive photon mapping: A probabilistic approach. *ACM Transactions on Graphics* (2011).

Lafortune E. P., Willems Y. D.: Bi-directional path tracing. In *Compugraphics* (1993).

Lafortune E. P., Willems Y. D.: Rendering participating media with bidirectional path tracing. In *Eurographics Rendering Workshop* (June 1996), pp. 91-100.

Lastra, M., Urena, C., Revelles, J., and Montes, R.: A particle-path based method for Monte Carlo density estimation. In *EG Workshop on Rendering*, EG Association. (2002).

Laur D., Hanrahan P.: Hierarchical splatting: A progressive refinement algorithm for volume rendering. In *Proceedings of SIGGR9PH.* (July 1991), pp. 285-288.

Lehtinen J., Zwicker M., Turquin E., Kontkanen J., Durand F., Sillion F. X., Aila T.: A meshless hierarchical representation for light transport. *ACM Transactions on Graphics* 27, 3 (August 2008), 37:1-37:9.

Neal R., Hinton G.: A view of the EM algorithm that justifies incremental, sparse, and other variants. *Learning in graphical models* 89 (1998), 355-368.

Papas M., Jarosz W., Jakob W., Rusinkiewicz S., Matusik W., Weyrich T.: Goal-based caustics. *Computer Graphics Forum (Proceedings of Eurographics '11)* 30, 2 (June 2011).

Pauly M., Kollig T., Keller A.: Metropolis light transport for participating media. In *Eurographics Workshop on Rendering* (June 2000), pp. 11-22.

Raab, M., Seibert, D., and Keller, A.: Unbiased global illumination with participating media. In *Monte Carlo and Quasi-Monte Carlo Methods* 2006. (2008) Springer, pp. 591-606.

Rusinkiewicz S., Levoy M.: Qsplat: A multi-resolution point rendering system for large meshes. In *Proceedings of ACM SIGGRAPH.* (July 2000), pp. 343-352.

Schjøth L., Frisvad J. R., Erleben K., Sporring J.: Photon differentials. In *GRAPHITE.* (2007), pp. 179-186.

Schjøth L., Sporring J., Olsen O. F.: Diffusion based photon mapping. *Computer Graphics Forum* 27, 8 (December 2008), 2114-2127.

Sillion F. X.: A unified hierarchical algorithm for global illumination with scattering volumes and object clusters. *IEEE Transactions on Visualization and Computer Graphics* 1, 3 (1995).

Silverman B. W.: *Density Estimation for Statistics and Data Analysis*. Monographs on Statistics and Applied Probability. Chapman and Hall, New York, N.Y., 1986.

Spencer B., Jones M. W.: Hierarchical photon mapping. *IEEE Transactions on Visualization and Computer Graphics* 15, 1 (January/February 2009), 49-61.

Spencer B., Jones M. W.: Into the blue: Better caustics through photon relaxation. *Computer Graphics Forum* 28, 2 (April 2009), 319-328.

Sun, X., Zhou, K., Lin, S., and Guo, B.: Line spacing gathering for single scattering in large scenes. *ACM Transactions on Graphics.* (2010).

Tan P., Lin S., Quan L., Guo B., Shum H.-Y.: Multi-resolution reflectance filtering. In *Proceedings Eurographics Symposium on Rendering* 2005 (2005), pp. 111-116.

Veach E., Guibas L.: Bidirectional estimators for light transport. In *Eurographics Workshop on Rendering* (1994).

Verbeek J. J., Nunnink J. R., Vlassie N.: Accelerated EM-based clustering of large data sets. *Data Mining and Knowledge Discovery* 13, 3 (November 2006), 291-307.

Walter B., Fernandez S., Arbree A., Bala K., Donikian M., Greenberg D. P.: Lightcuts: a scalable approach to illumination. *ACM Transactions on Graphics*. 24, 3 (August 2005).

Walter B., Arbree A., Bala K., Greenberg D. P.: Multidimensional lightcuts. *ACM Transactions on Graphics*. 25, 3 (2006).

Walter B., Bala K., Kulkarni M., Pingali K.: Fast agglomerative clustering for rendering. In *IEEE Symposium on Interactive Ray Tracing* (August 2008), pp. 81-86.

Yue, Y., Iwasaki, K., Chen, B. Y., Dobashi, Y., and Nishita, T.: Unbiased, adaptive stochastic sampling for rendering inhomogeneous participating media. *ACM Transactions on Graphics*. (2010).

Zhou K., Hou Q., Gong M., Snyder J., Guo B., Shum H.-Y.: Fogshop: Real-time design and rendering of inhomogeneous, single-scattering media. In *Pacific Graphics*. (2007), pp. 116-125.

Zhou K., Ren Z., Lin S., Bao H., Guo B., Shum H.-Y.: Real-time smoke rendering using compensated ray marching. *ACM Transactions on Graphics*. 27, 3 (2008).

Zwicker M., Pfister H., Van Saar J., Gross M.: Ewa splitting. *IEEE Transactions on Visualization and Computer Graphics* 8, 3 (July/September 2002), 223-238.

BRIEF SUMMARY

Embodiments of the invention propose an algorithm that operates on a new representation of volumetric radiance to efficiently render images. This representation is compact and expressive, solving the aforementioned problems. Instead of storing individual photons and performing non-parametric density estimation [Silverman] during rendering, embodiments of the invention progressively fit a small set of anisotropic Gaussians to the lighting distribution during photon tracing. Since each Gaussian is fit to the density of a large number of photons, complex lighting features can be accurately reconstructed during rendering using a small number (e.g., thousands) of Gaussians while providing better reconstruction than a large number (e.g., millions) of photons. Embodiments of the invention trivially provide temporal coherence and, to handle the varying contributions of Gaussians to the rendered image (due to attenuation and projected pixel size), embodiments of the invention propose a hierarchical approach which provides high-quality level-of-detail ("LOD"), which translates to the ability to dynamically request representations that have a desired amount of detail. A compact hierarchical representation provides direct performance benefits, which is demonstrated both in offline and interactive rendering.

In a rendering system that receives electronically readable representative data corresponding to objects in a computer-generated imagery ("CGI") scene of a virtual space and provides rendered radiance for the scene, a computer-implemented rendering method provides for rendering radiance of the scene using a lighting distribution represented by electronically readable representative data. The rendering method comprises (a) initializing distribution data structures based on the electronically readable representative data representing the lighting distribution; (b) partitioning the distribution data structures; (c) performing a photon simulation using the distribution data structures to create a representation of a plurality of photons in the scene; (d) creating a hierarchy of data elements having a plurality of levels, wherein each of a plurality of data elements at a given level corresponds to the plurality of photons; and (e) evicting from memory the plurality of photons and storing the hierarchy of data elements corresponding to the plurality of photons.

Further, the method may comprise (f) performing a progressive fitting of a hierarchical data structure to the hierarchy of data elements, wherein the hierarchical data structure includes at least one adjustable parameter; (g) repeating steps (a)-(f) and updating the hierarchy of data elements until a level of refinement to the lighting distribution is achieved; (h) constructing a set of hierarchical data structures with a plurality of levels, wherein a level of the set of hierarchical data structures corresponds to a particular level of detail; (i) determining at least one adjustable parameter for each of the hierarchical data structures at more than one of the levels according to an error heuristic; (j) determining if two or more of the hierarchical data structures can be replaced with one hierarchical data structure having its own adjustable parameters while approximating contributions of the two or more of the hierarchical data structures that may be replaced; (k) replacing the two or more of the hierarchical data structures with the one hierarchical data structure; (l) adjusting an error metric according to the replacement; (m) reconstructing the lighting distribution of the scene using the one hierarchical data structure; and (n) rendering the radiance of an image of the scene using the one hierarchical data structure.

BRIEF DESCRIPTION OF THE DRAWINGS

FIGS. 1(a)(1)-(2) and 1(b)(1)-(2) show examples of rendering with volumetric lighting.

FIGS. 5(a)(1)-(2) and 5(b)(1)-(2) show examples of rendering with volumetric lighting.

FIGS. 7(a)(1)-(2) and 7(b)(1)-(2) show exemplary scenes rendered using different techniques.

FIG. 8 shows an exemplary a table of statistics for a number of renderings.

FIG. 9 shows an exemplary notations table showing various notation used herein.

DETAILED DESCRIPTION

Figure 2:
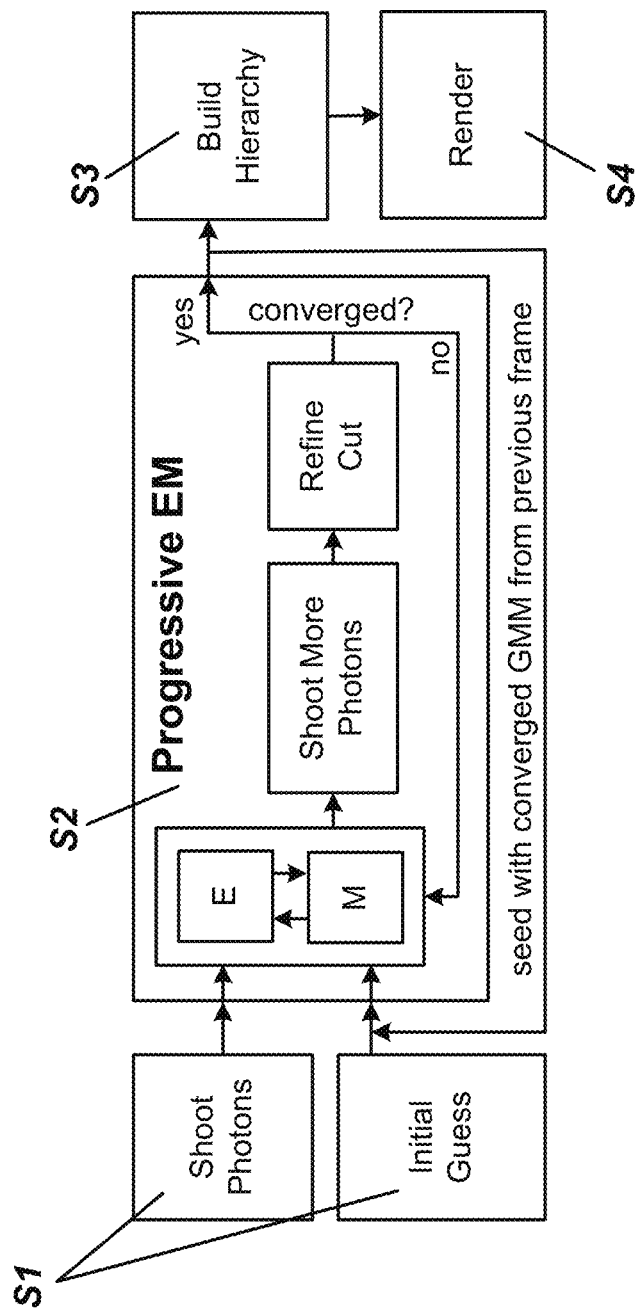
FIG. 2 shows an exemplary program flow of a rendering algorithm.

The present invention is described herein, in many places, as a set of computations. It should be understood that these computations are not performable manually, but are performed by an appropriately programmed computer, computing device, electronic device, or the like, that might be a general purpose computer, a graphical processing unit, and/or other hardware. As with any physical system, there are constraints as to the memory available and the number of calculations that can be done in a given amount of time. Embodiments of the present invention might be described in mathematical terms, but one of ordinary skill in the art, such as one familiar with computer graphics, would understand that the mathematical steps are to be implemented for execution in some sort of hardware environment. Therefore, it will be assumed that such hardware and/or associated software or instructions are present and the description below will not be burdened with constant mention of same. Embodiments of the present invention might be implemented entirely in software stored on tangle, non-transitory or transitory media or systems, such that it is electronically readable. While in places, process steps might be described by language such as "we calculate" or "we evaluate" or "we determine", it should be apparent in some contexts herein that such steps are performed by computer hardware and/or defined by computer hardware instructions and not persons.

The essential task of such computer software and/or hardware, in this instance is to generate images from a geometric model or other description of a virtual scene. In such instances, it will be assumed that the model/description includes description of a space, a virtual camera location and virtual camera details, objects and light sources. Also, here it will be assumed that there is some participating media, i.e., virtual media in the space that light from the virtual light sources passes through and interacts with. Such effects would cause some light from the light source to be deflected from the original path from the light source in some direction, deflected off of some part of the media and toward the camera viewpoint. Of course, there need not be actual light and actual reflection, but it is often desirable that the image be generated with realism, i.e., creating images where the effects appear to behave in a manner similar to how light behaves and interacts with objects in a physical space.

As explained above, simple images are easy to render, but often that is not what is desired. Complex images might include participating media such as fog, clouds, etc. but light from transformative objects might also need to be dealt with. An example is caustics, light paths created by light being bent, for example, by passing through glass shapes.

In many descriptions of image generators, the output image is in the form of a two-dimensional ("2D") or three-dimensional ("3D") array of pixel values and in such cases, the software and/or hardware used to generate those images is referred to as a renderer. There might be image generators that generate other representations of images, so it should be understood that unless otherwise indicated, a renderer outputs images in a suitable form. In some cases, the renderer renders an image or images in part, leaving some other module, component or system to perform additional steps on the image or images to form a completed image or images.

As explained, a renderer takes as its input a geometric model or some representation of the objects, lighting, effects, etc. present in a virtual scene and derives one or more images of that virtual scene from a camera viewpoint. As such, the renderer is expected to have some mechanism for reading in that model or representation in an electronic form, store those inputs in some accessible memory and have computing power to make computations. The renderer will also have memory for storing intermediate variables, program variables, as well as storage for data structures related to lighting, photons and the like, as well as storage for intermediate images. Thus, it should be understood that when the renderer is described, for example, as having generated multiple intermediate images and averaging them, it should be understood that the corresponding computational operations are performed, e.g., a processor reads values if pixels of the intermediate images, averages pixels and stores a result as another intermediate image, an accumulation image, or the final image, etc. The renderer might also include or have access to a random number generator.

In approaches described below and example described herein, state-of-the-art density estimation methods for rendering participating media rely on a dense photon representation of the radiance distribution within a scene. A critical bottleneck of such kernel-based approaches is the excessive number of photons that are required in practice to resolve fine illumination details, while controlling the amount of noise. A parametric density estimation technique is used to represent radiance using a hierarchical Gaussian mixture. Coefficients of this mixture are efficiently obtained for use in a progressive and accelerated form of an Expectation-Maximization ("EM") process. After this step, noise-free renderings of high-frequency illumination are created using only a few thousand Gaussian terms, where millions of photons are traditionally required. Temporal coherence is trivially supported within this framework, and the compact footprint is also useful in the context of real-time visualization. A hierarchical ray tracing-based implementation is demonstrated, as well as a fast splatting approach that can interactively render animated volume caustics.

Related Work

Photon Mapping.

Schjøth and colleagues demonstrated the benefits of anisotropic density estimation (see, e.g., [Schjøth07], [Schjøth08]) to obtain higher quality surface caustics with photon mapping. [Hachisuka] progressively refines radiance estimates at fixed measurement points to achieve convergent bias and variance in a view-dependent manner. Embodiments of the invention instead fit to the photon density by progressively refining both the positions and other parameters of an anisotropic Gaussian mixture, providing reduced variance and faster rendering from arbitrary viewpoints. Embodiments of the invention have a number of similarities to both hierarchical photon mapping representations (see, e.g., [Christensen], [SpencerA]) which provides LOD for final gather, and photon relaxation (see, e.g., [SpencerB]) which iteratively moves photon positions to reduce variance. By using Gaussian mixtures embodiments of the invention obtain both of these benefits while drawing upon a set of principled and well-established fitting techniques.

Hierarchical and Point-based Rendering.

Level-of-detail for light transport has been used to accelerate the Radiosity algorithm (see, e.g., [Hanrahan], [Sillion]) and volume visualization (see, e.g., [Laur]). Point-based, as shown in [Dobashi], and mesh-less, and shown in, [Lehtinen], variants allow for more flexible geometric representations while Lightcuts (see, e.g., [Walter05], [Walter08]) provides hierarchical evaluation of lighting from many pointlights.

A hierarchical rendering approach according to embodiments is related to hierarchical splatting of complex point-sampled geometry (see, e.g., [Rusinkiewicz]) and large stellar datasets (see, e.g., [Hopp], [Hopf]); however, embodiments of the invention use an anisotropic Gaussian representation. EWA splatting shown in [Zwicker] uses Gaussians to provide improved, alias-free reconstruction for surface and volume visualization. While embodiments of the invention share similar goals to these approaches, embodiments of the invention operate within a parametric density estimation context and progressively fit the positions and other parameters of anisotropic Gaussians to the photon density.

Parameter Fitting.

As opposed to previous global illumination techniques, which have relied primarily on non-parametric kernel density estimation such as the nearest neighbor method (see, e.g., [Si186]), techniques according to embodiments of the invention leverage a large body of work on parametric density estimation and parameter fitting. Instead of performing the density estimation solely during rendering, embodiments of the invention fit anisotropic Gaussians to the photon density during pre-computation.

The use of Gaussians for rendering participating media is not new (see, e.g., [Zhou07], [Zhou08]); however, previous methods used isotropic Gaussians to approximate the heterogeneous media density, whereas embodiments of the invention fit anisotropic Gaussians to the radiance distribution. Embodiments of the invention furthermore support hierarchical evaluation and leverage the well-established Expectation-Maximization (see, e.g., [Dempster]) ("EM") method specifically tailored for fitting anisotropic Gaussian mixtures.

While EM has seen recent use in image synthesis (see, e.g., [Tan], [Han], [Papas]), it has a much richer history in fields such as machine learning and data mining where hierarchical techniques shown in, for example, [Goldberger] and [Garcia], directly apply to LOD, and incremental techniques (see, e.g., [Neal], [Hasan]) provide parameter fitting within a limited memory footprint for streaming data. In these fields, however, large Gaussian mixtures are typically on the order of a few dozen to a few hundred components and their geometric quality is often only indirectly reproduced (e.g., color segmentation/classification). In contrast, to accurately fit volumetric lighting, embodiments of the invention rely on much larger Gaussian mixtures (e.g., tens of thousands), and their fitted parameters directly influence the quality of the rendered image. To obtain the necessary quality and performance under these conditions embodiments of the invention extend the accelerated EM method as shown in [Verbeek].

Radiative Transport in Participating Media

In the presence of participating media, the light incident at any point in the scene x (e.g., the camera) from a direction $\vec{w}$ (e.g., the direction through a pixel) as expressed by the radiative transport equation (see, e.g., [Chandrasekhar]) is the sum of two terms, as shown in Equation 1.

$$L(x,\vec{\omega}) = T_r(x \leftrightarrow x_b) L_s(x_b, \vec{\omega}) L_m(x, \vec{\omega}, b) \quad \text{(Eqn. 1)}$$

where the first term accounts for the radiance reflected off surfaces and the second term describes radiance scattered in the medium. Before reaching x, the radiance from the nearest surface at a distance $b, x_b = x - b\vec{\omega}$, is reduced by the transmittance $T_r$ which describes the percentage of light that propagates between two points (see [Dutré] for details). This is illustrated in the notation table of FIG. 9.

Using that notation, media radiance that integrates the scattered light up to the nearest surface is represented as in Equation 2, where $\sigma_s$ is the scattering coefficient of the medium, $f$ is the phase function, $\cos\theta_t = \vec{\omega}_t \cdot \vec{\omega}$, and $x_t = x - t\vec{\omega}$.

$$L_m(x, \vec{\omega}, b) = \int_0^b \int_{\Omega 4\pi} \sigma_s(x_t) T_r(x \leftrightarrow x_t) f(\theta_t) L(x_t, \vec{\omega}_t) d\vec{\omega}_t dt \quad \text{(Eqn. 2)}$$

This joint integral along the ray and over the sphere of directions, which recursively depends on the incident radiance (Eqn. 1), is what makes rendering participating media so costly.

Volumetric Photon Mapping and the BRE

Volumetric photon mapping of [Jensen] accelerates this computation using a two-stage procedure. First a photon map is populated by tracing paths from light sources and recording each scattering event as a "photon." Then, density estimation is performed over the photons to approximate the media radiance. To perform this computation efficiently, [Jarosz08] proposed the beam radiance estimate, which first assigns a radius $r_i$ to each of the n stored photons (using a pilot density estimate) and then approximates Equation 2 as Equation 3, where $x_i$, $\Phi_i$ and $\vec{\omega}_i$ are the position, power and incident direction of photon i respectively, $\cos\theta_t = \vec{\omega}_t \cdot \vec{\omega}$, and $K_i$ is a 2D normalized kernel of radius $r_i$ around photon i, evaluated at $x_t = x + ((x_i - x) \cdot \vec{\omega}) \vec{\omega}$.

$$L_m(x, \vec{\omega}, s) \approx \sum_{i=1}^{n} K_i(x_t) T_r(x \leftrightarrow x_i) f(\theta_i) \Phi_i \quad \text{(Eqn. 3)}$$

The term i is the index of photons. Note that [Jarosz08] included an additional $\sigma_s$ term. Embodiments of the invention account for this during photon tracing instead, to remain consistent with other sources (see, e.g., [Jensen], [Jarosz11]).

Unfortunately, there are a few common situations where the BRE is the bottleneck in rendering. Firstly, complex, high-frequency lighting may require an excessive number of photons, which increases storage costs and also slows down the beam query during rendering. Secondly, since the BRE always finds all photons that intersect the query ray, if the scene has a large extent, many photons may be processed which ultimately contribute very little to the final pixel color (due to subsequent attenuation or projected pixel size). FIGS. 1(a)-1(b) visualize the time spent performing the BRE per pixel, which shows this deficiency. A beam radiance estimate is shown in FIG. 1(a)(1) finds all photons along camera rays, which is a performance bottleneck for this scene due to high volumetric depth complexity and many photons (917K). FIG. 1(a)(2) shows the per-pixel render-time corresponding to the BRE of FIG. 1(a)(1).

FIG. 1(b)(1) shows embodiments of the invention fitting a hierarchical, anisotropic Gaussian mixture model to the photons and can render this scene faster, and with higher quality using only (4K) Gaussian components. FIG. 1(b)(2) shows the per-pixel render-time. The listed times shown in FIGS. 1(a)(2) and 1(b)(2) denote the costs of the preprocessing stage (including photon tracing and hierarchy construction), as well as the final rendering stage, respectively. Embodiments of the invention address both of these problems by expressing the distribution of photons in the media using a hierarchical, anisotropic Gaussian mixture.

Gaussian Mixtures

Embodiments of the invention involve Gaussian mixture models (GMMs), maximum likelihood estimation, and Expectation-Maximization in terms of the present rendering problem.

Given a collection of photons $X = \{x_i\}_1^n$, volumetric photon mapping corresponds to estimating the underlying probability distribution p(x). In general, p(x) could be any distribution obtainable using photon tracing. Photon mapping estimates this distribution using kernel density estimation, whereas embodiments of the invention rely on a GMM. More precisely, embodiments of the invention assume that the underlying probability density can be modeled using a weighted sum of k probability distributions, as shown in Equation 4, where $\Theta_s$ denotes the parameters for distribution s and $\Theta = \{\Theta_s\}_1^k$ defines the model parameters for the entire mixture.

$$p(x) \approx p(x|\Theta) = \sum_{s=1}^{k} w_s g(x|_s) \quad \text{(Eqn. 4)}$$

Each individual component g is a normalized multivariate Gaussian, as shown in Equation 5, where $\Theta_s = (\mu_s, w_s, \Sigma_s)$ with mean $\mu_s$, covariance matrix $\Sigma_s$, and weighted by $w_s$. Embodiments of the invention use $|\cdot|$ to denote the determinant and always use s to index into the Gaussian components.

$$g(x|\Theta_s) = \frac{\exp\left(-\frac{1}{2}(x-\mu_s)^T \Sigma_s^{-1} (x-\mu_s)\right)}{(2\pi)^{3/2}\sqrt{|\Sigma_s|}} \quad \text{(Eqn. 5)}$$

Since photons are not actually generated using a Gaussian process, (4) is an approximation, but by increasing k a Gaussian mixture can model any photon distribution with arbitrary accuracy.

Maximum Likelihood Estimation

With the assumptions above, the problem is reduced to finding the values of the model parameters $\Theta_s$ for each of the k Gaussians, which, when entered into the model (4), are most likely to generate the photons. More formally, such maximum likelihood estimators seek the parameters $\Theta$ that maximize of the associated data log likelihood $$\mathcal{L}(\Theta) = \sum_{i=1}^{n} \log(p(x_i|\Theta)) \quad \text{(Eqn. 6)}$$

Note that the actual photon density p(x) is not an explicit part of this formulation; instead, it only enters the problem statement via evaluation of the GMM (4) at the photon positions.

Expectation Maximization

The popular EM algorithm is an iterative technique for finding such a maximum likelihood parameter estimate. Instead of maximizing L directly (which is usually intractable), EM starts with an initial guess of the parameters $\Theta$ and modifies them so that a lower bound $F \leq L$ is strictly increased in every one of its iterations. The bound F is chosen so that its local maxima coincide with those of L hence, it is guaranteed that the algorithm eventually converges to a local maximum of L.

During the optimization, EM makes use of a series of discrete distributions $q_i(s)$: $\{1, \ldots, k\} \to [0,1]$ (one for each photon $x_i$), which specify the associated photon's "responsibility" towards each GMM component. The lower bound $F(\Theta, q)$ can then be expressed as a function of the parameters $\Theta$, as well as the auxiliary distributions $q_i$. An intuitive and general interpretation of the EM-type algorithm can then be formulated as [Neal]:

E-Step: Given $\Theta$, find q that maximizes $F(\Theta, q)$, then

M-Step: Given q, find $\Theta$ that maximizes $F(\Theta, q)$.

Accelerated EM

In this paper, embodiments of the invention make use of a technique called accelerated EM (see, e.g., [Verbeek]). The insight of this approach is to assign the same distribution $q_i(s) = q_A(s)$ to all photons $x_i$ that fall into the same cell A of a spatial partition P of $R^3$. P is simply a subdivision of space where any point lies in exactly one cell, e.g., the collection of cells of a Voronoi diagram, or a cut through a kd-tree or octree. This allows rephrasing the EM algorithm purely in terms of operations over cells (as opposed to photons).

For the E-step, [Verbeek] provides a provably-optimal assignment of the responsibilities:

$$q_A(s) = \frac{w_s \exp\langle \log g(x|\Theta_s)\rangle_A}{\sum_{a=1}^{k} w_a \exp\langle \log g(x|\Theta_a)\rangle_A} \quad \text{(Eqn. 7)}$$

where $\langle f(x)\rangle_A$ denotes the average of a function $f$ over all photons that fall within cell A. They also give an expression for the lower bound F as a sum over the partition's cells:

$$\mathcal{F}(\Theta, q) = \sum_{A \in P} n_A \sum_{s=1}^{k} q_A(s)\left[\log\frac{p(s)}{q_A(s)} + \langle \log g(x|\Theta_s)\rangle_A\right] \quad \text{(Eqn. 8)}$$

The average log-densities in (7) and (8) can be readily computed in closed-form for Gaussian mixtures (see, e.g., [Verbeek]). For this, embodiments of the invention only need to store the average photon position $\langle x \rangle_A$ and outer product $\langle xx^T \rangle_A$ within each cell.

The accelerated M-step computes the parameters $\Theta_s$ as weighted averages over cell statistics:

$$\Theta_s = (w_s, \mu_s, \Sigma_s)\frac{1}{n}\sum = \sum_{A \in P} n_A q_A(s)\left(1, \frac{\langle x \rangle_A}{w_s}, \frac{\langle xx^T \rangle_A - \mu_s \mu_s^T}{w_s}\right) \quad \text{(Eqn. 9)}$$

where n denotes the total number of photons and $n_A$ specifies the number of photons that fall within cell A. Note that the terms of $\Theta_s$ need to be computed in sequence to satisfy interdependencies. A naïve accelerated EM implementation is shown in Algorithm 1.

TABLE 1

Algorithm 1
Algorithm 1 ACCELERATED EM-NAÏVE ($\Theta^{(0)}, \mathcal{P}$)

| | |
|---|---|
| 1 | z = 0　　　　// iteration counter |
| 2 | repeat |
| 3 | 　Compute the distribution $q_A(s)$ for each $A \in \mathcal{P}$ using (7) |
| 4 | 　Compute $\Theta^{(z+1)}$ using Equation (9) |
| 5 | 　z = z + 1 |
| 6 | until $|\mathcal{F}(\Theta^{(z)}, q^{(z)})/\mathcal{F}(\Theta^{(z-1)}, q^{(z-1)}) - 1| < \epsilon$ |

This formulation has several advantages for photon mapping, some of which include a compact representation, fast iterations, and multi-resolution fitting. With compact representation, the photons $x_i$ can be discarded, and only a few sufficient statistics of their behavior within each cell $A \in \mathcal{P}$ need be stored. For fast iterations, a small number of statistics succinctly summarize the photons within a cell. Good results can be obtained with comparatively few cells, where many photons would be needed by non-accelerated EM; this allows for shorter running times. For multi-resolution fitting, the partition need not necessarily stay the same over the course of the algorithm. Reminiscent of multi-grid methods, embodiments of the invention can start with a relatively rough partition and refine it later on.

Overview

Embodiments of the invention apply the concepts of accelerated EM to the problem of rendering participating media using photon tracing. At a high-level, embodiments of the invention replace individual photons in the BRE with multivariate Gaussians which are fit to the photons using EM. Since a Gaussian is fit to a large collection of photons, each term is inherently less noisy and more expressive than an individual photon. This provides high quality reconstruction using a relatively low number of terms, which results in faster rendering at the expense of a slightly longer view-independent pre-computation stage.

Embodiments of the invention extend accelerated EM in three simple but important ways. Embodiments of the invention firstly introduce sparsity into the algorithm to obtain asymptotically faster performance. Secondly, embodiments of the invention incorporate progressive refinement by incrementally shooting photons, updating statistics in the partitions, and refining the EM fit. This elegantly allows memory-bounded fitting of extremely large collections of photons while simultaneously providing an automatic stopping criterion for photon tracing. Embodiments of the invention call this process progressive EM. Embodiments of the invention believe this extension could also find applicability in data mining for incremental fitting of streaming data. Lastly, embodiments of the invention build a full GMM pyramid which allows us to incorporate hierarchical LOD during rendering.

This algorithm is divided into four key steps (see FIG. 2):

S1. Photon tracing: Trace photons within the scene (just like in photon mapping), storing the resulting statistics in the partition P, then discard the photons.

S2. Progressive GMM fitting: Apply progressive EM to the statistics in P. Should the stored statistics be too noisy, repeat step 1 by shooting more photons, updating statistics, and continue refining the GMM fit.

S3. Level-of-Detail: Construct a full LOD pyramid of GMMs with decreasingly many components.

S4. Hierarchical Rendering: For each ray, hierarchically prune the LOD pyramid to the set of Gaussians with sufficient contribution according to a conservative error heuristic.

Embodiments of the invention focus on practical considerations for implementing these steps in the following sections and omit details for the first stage since it is identical to standard photon mapping.

Progressive GMM Fitting

A progressive EM algorithm according to embodiments of the invention is outlined in Algorithm 2. The core of the approach is based on accelerated EM, but embodiments of the invention introduce sparsity to lines 4-5, progressively update the statistics (line 8), and use a more efficient cut refinement procedure (line 10).

TABLE 2

Algorithm 2
Algorithm 2 PROGRESSIVE EM $(\Theta^{(0)}, \mathcal{P})$

| 1 | $z = 0$ | // iteration counter |
| 2 | repeat | |
| 3 |   repeat | |
| 4 |     Compute the distr. $q_A(s)$ for each $A \in \mathcal{P}$ using (7) | |
| 5 |     Compute $\Theta^{(z+1)}$ using Equation (9) | |
| 6 |     $z = z + 1$ | |
| 7 |   until $|\mathcal{F}(\Theta^{(z)}, q^{(z)})/\mathcal{F}(\Theta^{(z-1)}, q^{(z-1)}) - 1| < \epsilon$ | |
| 8 |   if Equation (10) indicates an unsatisfactory fit | |
| 9 |     Shoot more photons and update statistics | |
| 10 |   Expand cut along 50% "best" nodes according to $\mathcal{F}(8)$ | |
| 11 | until the relative change in the expanded $\mathcal{F}$ drops $< \epsilon$ | |

Partition Construction

An algorithm according to embodiments of the invention assumes the availability of a partition P. To obtain a spatial partition of $R^3$, embodiments of the invention follow an approach similar to the one taken by [Verbeek]: embodiments of the invention create an entire family of possible partitions by constructing a balanced kd-tree over the photon positions, where each leaf and inner node is augmented with the aforementioned sufficient statistics; this can be done in O (n log n) time. Any cut through the tree then forms a valid partition. To ensure that the tree fits in memory, embodiments of the invention use a moderate number of photons (n=128·k) and create a leaf node once the number of photons in a sub-tree drops below 5. After this step, all memory associated with the photons can be released, and only the hierarchy remains.

Embodiments of the invention initialize the cut to the level of the kd-tree where the number of cells equals eight times the number of GMM components, which may be a good compromise in terms of the total running time.

Progressive Update and Cut Refinement

After running E- and M-steps until convergence, embodiments of the invention check the effective number of photons that contribute to GMM component s:

$$n_{\mathit{eff}}(s) = \sum_{A \in P} n_A q_A(s) \quad \text{(Eqn. 10)}$$

If any Gaussian is fit to fewer than 64 photons, embodiments of the invention deem these statistics to be unreliable, so embodiments of the invention shoot more photons, and progressively update the statistics. Shooting more photons reduces the variance of the statistics, converging to the proper average of these quantities within each cell in the limit.

After this step, embodiments of the invention use a greedy criterion to push down the partition cut. This entails removing nodes and replacing them by their children in the kd-tree. [Verbeek] proposed expanding the cut by one node in each outer iteration, but embodiments of the invention found that this results in slow convergence. Instead, embodiments of the invention determine the most suitable set of nodes by computing the increase in F(8) for each possible replacement and execute the top 50% of them. Embodiments of the invention repeat this entire procedure until fitting parameters converge.

Figure 3A:
FIGS. 3(a)-3(e) show exemplary snapshots of an image during a rendering process.
Figure 3B:
Figure 3C:
Figure 3D:
Figure 3E:

FIGS. 3(a)-3(e) illustrate this procedure on an image-based density function. As a simple two-dimensional application according to embodiments of the invention, a 1024-term GMM is fit to an image-based target density function in FIG. 3(a). A coarse initial cut FIG. 3(b) is used at the start, and GMM parameters in FIG. 3(c) are refined until they converge in FIGS. 3(d) and 3(e). The progressive EM iterations and cut refinement, as well as the computation of Equation 10, can all be done efficiently using ideas discussed in the next section.

Exploiting Sparsity

Unfortunately, the complexity of this algorithm renders it impractical for large-scale problem instances, which are the main focus of this paper. In particular, although the computation of (7) and (9) no longer depends on the number of photons, the cost is linear in the product of $|\mathcal{P}|$ and k. To obtain a reasonable fit, the final cut will usually satisfy $|\mathcal{P}|$=c·k, for some constant c>1, hence the running time is in $O(k^2)$.

To work around the complexity issue, the fitting pipeline, as described in embodiments of the invention, exploits the inherent sparsity of this problem: due to the exponential falloff in g, it is reasonable to expect that a cell $A \in \mathcal{P}$ will exert little influence on a distant Gaussian component s. In the context of accelerated EM, this means that the value of $q_A(s)$ will be negligible. Embodiments of the invention may thus want to skip such cell-GMM component pairs in the calculation of (9) or (10).

There is one caveat to the previous idea: suppose that a cell $A \in P$ is located relatively far away from all of the GMM components. Although the numerator in $q_A(s)$ (7) will be very small in this case, $q_A(s)$ will nonetheless exert a significant influence on distant GMM components due to the normalization term in its denominator. This means that a pruning criterion cannot be based on spatial distance alone.

Embodiments of the invention proceed in two stages: first, embodiments of the invention determine the normalization term in the denominator of $q_A(s)$ (7) for each cell $A \in \mathcal{P}$. Following this, embodiments of the invention recalculate the GMM parameters $\Theta$ and effective photon counts $n_{\mathit{eff}}(s)$ using Equation (9) and (10). All of these steps exploit sparsity and obey a user-specified relative error tolerance $\tau$, such that the algorithm becomes faster and more approximate with higher $\tau$ and degenerates to the $O(n^2)$ approach when $\tau=0$. Specifically, embodiments of the invention loosely bound $q_A$ as a function of spatial distance and drop Gaussian-cell pairs with the help of a bounding volume hierarchy when this does not cause the result to exceed the specified error bound. All results according to embodiments of the invention use $\tau=10^{-4}$.

Initial Guess and Temporal Coherence

EM requires an initial guess which is iteratively refined. Since EM will, in general, only converge to a local maximum of L, the starting parameters are an important factor in the final quality of the EM fit.

For still images embodiments of the invention obtain an initial guess by extracting a suitably-sized horizontal cut through the partition kd-tree. Each cell in this cut already stores the sufficient statistics that are needed to analytically fit a Gaussian to its contents, hence this step takes negligible time.

For animations embodiments of the invention could apply the same procedure for each frame independently. However, like any photon mapping method, the stochastic positions of photons can introduce temporal flicking Embodiments of the invention can achieve significantly better quality by seeding EM with the converged GMM parameters from the previous frame (a similar idea was used by [Zhou08] for temporally coherent non-linear optimization). This optional step does introduce dependence between frames, but in embodiments of the invention it may be performed to eliminate temporal flicker. Furthermore, since the previous frame is often a remarkably good match to the current lighting, this significantly reduces the computation time needed for fitting (for instance, fitting the exemplary animation is 4.35× faster compared to frame-independent initialization).

Level-of-Detail Construction

To render the GMM at various levels of detail, embodiments of the invention wish to construct a hierarchical representation of the Gaussian mixture. In embodiments of the invention, the leaves are the components of the GMM, interior levels approximate the GMM using decreasing numbers of Gaussian components, up to the root which expresses the entire distribution as a single Gaussian. Note that embodiments of the invention cannot simply compute a multi-resolution representation (where each level of the tree is an independent GMM with $2^l$ components). Since embodiments of the invention will dynamically select subsets of this tree for rendering, there needs to be a proper nesting between the levels of the hierarchy such that a node is a representative for its entire sub-tree.

To accomplish this efficiently, embodiments of the invention apply a modified version of a heap-based agglomerative clustering algorithm (see, e.g., [Walter08]) as shown in Algorithm 3. Embodiments of the invention denote nodes of the GMM pyramid as $\overline{\Theta}$ and index a specific node as $\overline{\Theta}_j$. Embodiments of the invention initialize the leaves of the pyramid (line 1) to the Gaussian mixture, $\{\Theta_s\}_1^k$, constructed in Section 5. To form the next higher level, embodiments of the invention start with a heap of all minimum Gaussian distances in the current level (lines 6-8) and then merge (and remove) the two "most similar" Gaussians until no Gaussians are left in the heap (lines 9-15). Repeating this entire process $\log_2 k$ times creates a full binary tree.

TABLE 3

Algorithm 3
Algorithm 3 CONSTRUCT GAUSSIAN PYRAMID ($\Theta = \{\Theta_2\}_1^k$)

| | | |
|---|---|---|
| 1 | $\overline{\Theta} = \Theta$ | // construct tree starting with leaf nodes |
| 2 | level =$\log_2 k$ | |
| 3 | while level > 0 | // loop until embodiments of the invention reach the root |
| 4 | $\overline{\Theta}' = \emptyset$ | // initialize next level to empty set |
| 5 | H = $\emptyset$ | // initialize min-heap to empty set |
| 6 | for each Gaussian $j_1 \in \overline{\Theta}$ | |
| 7 | Find closes Gaussian $j_2$ to $j_1$ according to (11) | |
| 8 | Insert edge $(j_1, j_2)$ into H. | |
| 9 | While H ≠ $\emptyset$ | |
| 10 | Pop an edge e from the heap | |
| 11 | if neither endpoint of e has been previously merged | |
| 12 | Merge the two Gaussians of e according to Equations (12-14) and insert into $\overline{\Theta}'$ | |
| 13 | for all vertices $j_1$ connected to either end of e | |
| 14 | Find the closest Gaussian $j_2$ to $j_1$ | |
| 15 | Insert edge $(j_1, j_2)$ into H. | |
| 16 | $\overline{\Theta} = \overline{\Theta}'$ | |
| 17 | level = level − 1 | |
| 18 | return $\overline{\Theta}$ | |

Embodiments of the invention calculate the distance between Gaussians using a symmetric dissimilarity function as shown in Equation 11, where $D_{KL}$ is the Kullback-Leibler divergence between component $j_1$ and $j_2$, and takes on a simple analytical form in the case of multivariate Gaussians [Garcia].

$$d(j_1, j_2) = w_{j_1} w_{j_2} \min(D_{KL}(\overline{\Theta}_{j_1} \| \overline{\Theta}_{j_2}), D_{KL}(\overline{\Theta}_{j_2} \| \overline{\Theta}_{j_1})) \quad \text{(Eqn. 11)}$$

Kullback-Leibler divergence is a fundamental statistical measure of relative entropy between two distributions and has been used extensively for clustering Gaussian distributions (see, e.g., [Goldberger], [Garcia]).

To merge Gaussians $\overline{\Theta}_{j_1}$ and $\overline{\Theta}_{j_2}$ into $\overline{\Theta}_j$, embodiments of the invention analytically fit parameters as follows (see, e.g., [Goldberger]):

$$\overline{w}_j = \overline{w}_{j_1} \overline{w}_{j_2} + \quad \text{(Eqn. 12)}$$

$$\overline{\mu}_j = \overline{w}_j^{-1}(\overline{w}_{j_1} \overline{\mu}_{j_1} \overline{w}_{j_2} \overline{\mu}_{j_2}) \quad \text{(Eqn. 13)}$$

$$\sum_j = \overline{w}_j^{-1} \sum_{k \in \{j_1, j_2\}} \overline{w}_k \left( \sum_k + (\overline{\mu}_k - \overline{\mu}_j)(\overline{\mu}_k - \overline{\mu}_j)^T \right) \quad \text{(Eqn. 14)}$$

This procedure according to embodiments of the invention eventually forms a full binary tree that embodiments of the invention use for hierarchical pruning during rendering.

Rendering

During rendering, for a given query ray passing through the medium, embodiments of the invention are interested in approximating the medium radiance (2) using the GMM. If the hierarchy constructed in the last section is ignored, the beam radiance estimate (3) could adapt by replacing photons $x_i$ and kernels $K_i$ with the components $g(x|\Theta_s)$ of the Gaussian mixture.

All the Gaussian terms, in theory, contribute to the media radiance along a query ray, but in reality some components may contribute very little (due to distance to the ray, significant attenuation, or small projected solid angle). The hierarchy constructed in the last section allows embodiments of the invention to efficiently incorporate LOD. The main idea behind embodiments of the invention is to traverse the GMM pyramid top-down and hierarchically prune the traversal when the interior nodes are deemed a reasonable approximation for their sub-tree. To facilitate this hierarchical pruning, embodiments of the invention augment the GMM pyramid with an axis-aligned bounding-box (AABB) hierarchy (BBH).

Bounding-Box Hierarchy Construction

Embodiments of the invention spatially bound each Gaussian by computing the distance at which its remaining energy is a small percentage of the total energy of the Gaussian mixture. This truncates each anisotropic Gaussian to an ellipsoid. Embodiments of the invention initialize the bounding box of each node to tightly fit its truncated Gaussian. Embodiments of the invention then complete the BBH by propagating the bounding-box information up the tree: each node's bounding box is joined with the bounding box of its two child nodes. This construction can be performed efficiently in O (k log k) using two sweeps of the Gaussian pyramid.

Hierarchical Traversal

For fast hierarchical rendering, embodiments of the invention prune entire sub-trees of the GMM pyramid during ray traversal by accounting for the expected contribution of each Gaussian to the rendered image. For a given query ray r, embodiments of the invention start at the root. At each node embodiments of the invention decide between three possible outcomes: 1) the entire sub-tree can be skipped, 2) the sub-tree can be well approximated by adding the contribution of the current node to the BRE, or 3) embodiments of the invention need to descend further.

Embodiments of the invention first intersect the ray with the bounding box of the node. If there is no hit, embodiments of the invention skip the entire sub-tree. Otherwise, embodiments of the invention compute the projected solid angle of the node's bounding sphere $\Omega_j(r)$ and compare it to the solid angle of a pixel of the ray $\Omega(r)$. If $\Omega_j(r) < \epsilon_\Omega \Omega(r)$, for a user-specified threshold $\epsilon_\Omega$, embodiments of the invention evaluate the contribution of the node's Gaussian. If this test fails, embodiments of the invention additionally compute the transmittance between the origin of the ray and the first hit point with the bounding box, $T_r(r, \Theta_j)$. If this is less than a user-specified constant, $\epsilon_{T_r}$, embodiments of the invention evaluate the node's Gaussian. Only if all these tests fail do embodiments of the invention descend further down the BBH.

Figure 4A:
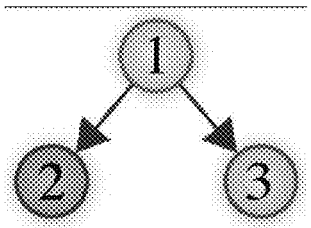
FIGS. 4(a)-4(e) illustrate embodiments of an algorithm used in rendering.
Figure 4B:
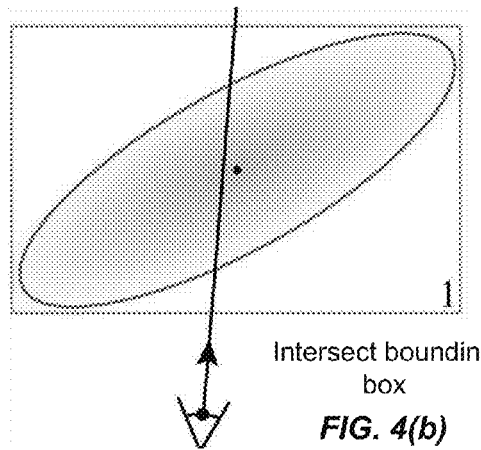
Figure 4C:
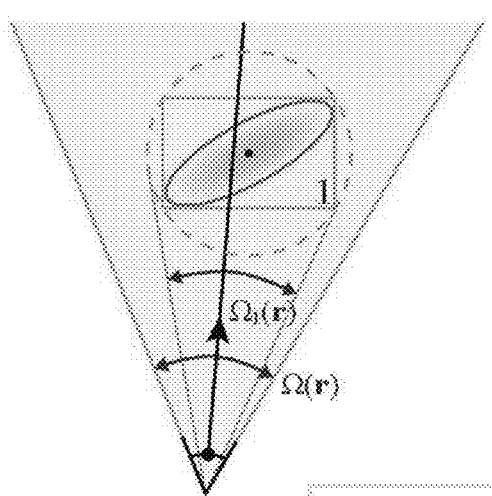
Figure 4D:
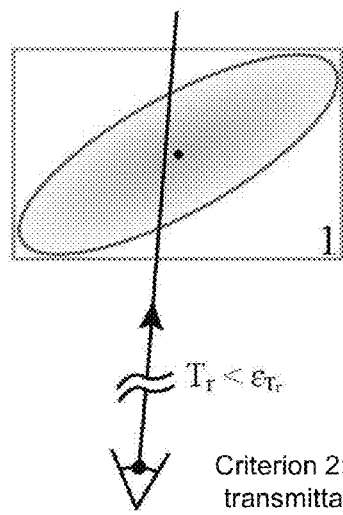
Figure 4E:
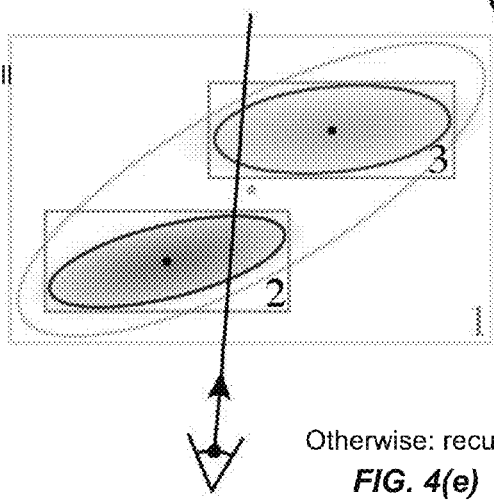

These cases are illustrated in FIGS. 4(a)-4(e) and are outlined in Algorithm 4. In FIG. 4(a), the hierarchy of Gaussians is traversed from top to bottom, intersecting the current node's AABB in FIG. 4(b). In FIG. 4(c), the solid angle of the representative is tested, and the extinction is checked before traversing down the tree in FIG. 4(d).

TABLE 4

Algorithm 4
Algorithm 4 HIERARCHICAL BRE (r, $\Theta_j$)

| | |
|---|---|
| 1 | if r does not intersect AABB ($\Theta_j$) |
| 2 | return 0 |

TABLE 4-continued

Algorithm 4
Algorithm 4 HIERARCHICAL BRE (r, $\Theta_j$)

| | |
|---|---|
| 3 | if ($\Omega_j$ (r) < $\epsilon_\Omega \Omega$(r)) or (T$_r$ (r, $\Theta_j$) < $\epsilon_{T_r}$) |
| 4 | return Gaussian contribution using Equation (15) |
| 5 | return HIERARCHICALBRE (r, $\Theta_{2j}$) + HIERARCHICALBRE (r, $\Theta_{2j+1}$) |

To evaluate the contribution of a Gaussian, embodiments of the invention need to integrate it along $r(t) = x - t\vec{\omega}$ while accounting for transmittance.

$$L_m^j(x, \vec{\omega}, b) = \frac{1}{4\pi}\vec{w}_j \int_0^b g(r(t)|_j^-)T_r(x \ominus r(t)) dt \leftarrow \quad \text{(Eqn. 15)}$$

This corresponds to a single summand in (3) for isotropic scattering. As in Equation (3), neither $\sigma_s$, nor the albedo are used here because embodiments of the invention account for these terms during photon tracing.

For homogeneous media, the integral in Equation (15) accepts the closed-form solution:

$$\int_a^b g(r(t)|\Theta_j)e^{-\sigma_t t} dt = C_0\left[\text{erf}\left(\frac{C_3 + 2C_2 b}{2\sqrt{C_2}}\right)\text{erf}\left(\frac{C_3 + 2C_2 a}{2\sqrt{C_2}}\right)\right] \quad \text{(Eqn. 16)}$$

where the constants $C_0$ through $C_3$ are:

$$C_0 = \frac{\exp\left(\frac{C_3^2}{4C_2} - C_1\right)}{(2\pi)^{\frac{3}{2}}\sqrt{|\Sigma_j|}}, \quad C_1 = \frac{1}{2}(x - \bar{\mu}_j)^T \sum_j^{-1}(x - \bar{\mu}_j) - \sigma_t b, \quad \text{(Eqn. 17)}$$

$$C_2 = \frac{1}{2}\vec{\omega}^T \sum_j^{-1} \vec{\omega}, \quad C_3 = \vec{\omega}^T \sum_j^{-1}(x - \bar{\mu}_j) + \sigma_t.$$

For heterogeneous media embodiments of the invention could take an approach similar to the BRE and compute this integral numerically using ray marching.

Implementation and Results

Embodiments of the invention implemented the hierarchical GMM rendering approach in a Monte Carlo ray tracer and also implemented the BRE in the same system to facilitate comparison.

GPU Splatting

In addition to the general hierarchical ray tracing solution described in Section 7.2, embodiments of the invention have also implemented a GPU splatting approach which allows us to interactively preview arbitrary levels of the GMM mixture.

Each Gaussian component is rendered as an elliptical splat corresponding to the screen-space projection of the truncated Gaussian ellipsoid. Each splat is rendered as a triangle strip and Equation (15) is evaluated in a fragment shader with additive blending. This gives correct results for homogeneous media. While the GPU implementation according to embodiments of the invention ignores surface interactions, it nonetheless provides a useful tool to interactively preview the media radiance.

Results

Parameters and rendering statistics for all scenes are listed in Table 2. Note that the preprocessing costs listed for the BRE and progressive EM methods include the time spent tracing photons.

Both exemplary scenes shown in FIGS. 1 and 5 contain several light sources and have a relatively large depth-extent. FIGS. 1(a)(1) and 5(a)(1) show a rendering with the BRE, and FIGS. 1(b)(1) and 5(b)(1) show a rendering with embodiments of the invention, as well as visualizations of the rendering time spent in each pixel. With the BRE, regions of the image that contain large concentrations of photons take longer to render, even if these photons contribute little to the final pixel color. The hierarchical rendering technique according to embodiments of the invention solves this problem by detecting and pruning such low contribution sub-trees in the GMM pyramid. The resulting images are higher quality and render faster. Furthermore, since pre-computation is view-independent, fly-through animations render very quickly once the Gaussian mixture is constructed.

As shown in FIG. 5(a)(1), the high volumetric depth complexity and large number of photons (3.1M) makes the BRE inefficient, rendering at (133+344=477 s), with FIG. 5(a)(1) showing the per-pixel render-time. Embodiments of the invention use a hierarchical, anisotropic Gaussian mixture with only 16K Gaussian components, shown in FIG. 5(b)(1), accomplished in (226+100=326 s). The per-pixel render-time is shown in FIG. 5(b)(2).

Figure 6A:
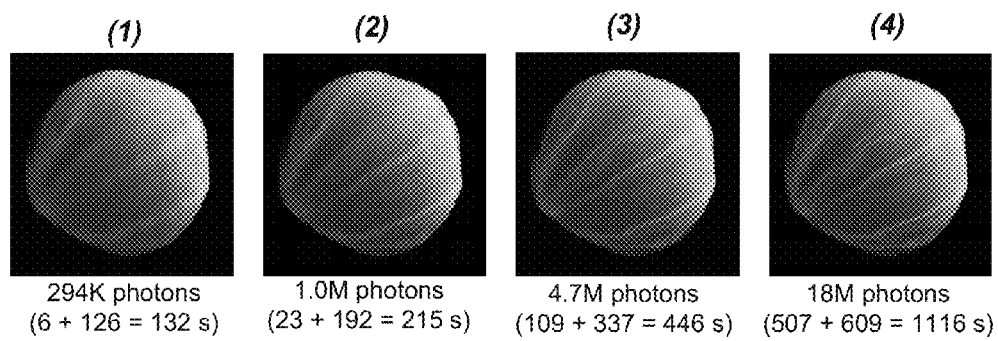
FIGS. 6(a)(1)-(4) and 6(b)(1)-(4) show exemplary renderings of an image using different techniques.
Figure 6B:
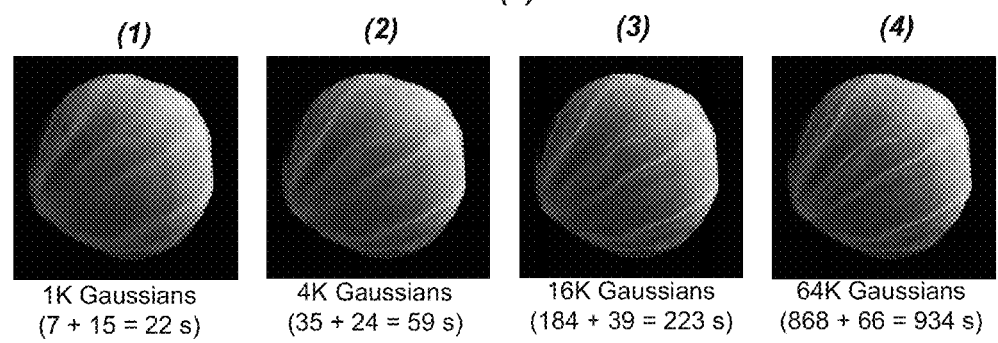

FIGS. 6(a)(1)-(4) and 6(b)(1)-(4) show a progression of renderings of the exemplary scene with increasing numbers of Gaussian components. Renderings using methods according to embodiments of the invention are shown in FIG. 6(b)(1)-(4), listing the number of Gaussians and denoted rendering times, and corresponding BRE renderings using all photons in the Gaussian fit are shown in FIG. 6(a)(1)-(4), also listing the number of photons and denoted rendering times. As before, the listed times correspond to the preprocessing and rendering stages, respectively.

Though compact GMM representation uses only a few thousand Gaussian components (ranging from 1K to 64K) embodiments of the invention are able to faithfully capture high-frequency caustic structures because embodiments of the invention progressively fit to a large number of photons (up to 18 million). Embodiments of the invention also show BRE results which use all the available photons during rendering. Each BRE result takes longer to render than the corresponding GMM rendering (between 7.8 and 9.2× slower for the rendering pass, and 1.2 to 6.0× slower including the pre-computation stage). Since the BRE uses isotropic density estimation, even with all the photons it produces both noisier and blurrier results. An anisotropic GMM fitting procedure according to embodiments of the invention acts like an intelligent noise-reduction and sharpening filter that automatically finds structures in the underlying density in a way not possible with on-the-fly density estimation.

FIGS. 7(a)(1)-(2) and 7(b)(1)-(2) show other exemplary scenes depicting detailed volume caustics. FIG. 7(a)(1) shows an exemplary scene with BRE rendering and FIG. 7(a)(2) shows the exemplary scene with anisotropic GMM fitting rendering. FIG. 7(b)(1) shows another exemplary scene with the BRE rendering and the anisotropic GMM fitting rendering in FIG. 7(b)(2), comparing the BRE with 2M photons and the anisotropic GMM fitting method with 16K Gaussians. These high-frequency structures are difficult to reconstruct even when using over 4M isotropic photon points with the BRE (FIGS. 7(a)(1) and 7(b)(1)), while the anisotropic fitting process according to embodiments of the invention produces slightly better results 1.2× and 1.6× faster using only 16K Gaussian components (FIGS. 7(a)(2) and 7(b)(2)).

When animated, embodiments of the invention also obtain increased performance since the previous frame is a closer match to the converged solution and less EM iterations are required. The total fitting time for the animation shown in FIGS. 6(b)(1)-(4) is 4.35× lower using the temporally coherent method.

Discussion and Future Work

Anisotropic Media.

A significant limitation of current implementation is that embodiments of the invention only handle isotropic media. Embodiments of the invention could be naturally extended to additionally store directional information during fitting. One option is to perform the fitting procedure entirely in a 5D spatio-directional domain where each component is the tensor product of a spatial Gaussian and a von Mises-Fischer distribution. In other variations of embodiments of the invention would be to treat the two domains separately and fit von Mises-Fischer distributions to the directional statistics under the support of each 3D Gaussian in a similar fashion to previous multi-resolution methods for surface reflectance (see, e.g., [Tan], [Han]).

Performance, Quality, and Scalability.

The render pass according to embodiments of the invention is considerably faster than the BRE due to the reduced number of terms and hierarchical pruning during traversal. Yet, in other variations of embodiments of the invention may be able to obtain higher quality results with such few terms since the Gaussians according to embodiments of the invention are anisotropic and inherently less noisy than individual photons. Even including pre-computation, the total time to render is faster than the BRE for the scenes embodiments of the invention tried. Furthermore, since the fitting is view-independent, variations of embodiments of the invention may provide an even greater performance benefit for walk-throughs of static or pre-scripted lighting.

GMMs are also an attractive low-memory representation for volumetric lighting: For instance, a 4096-term GMM requires only 240 kilobytes of storage.

Though the pre-computation stage can be slightly slower, the statistics in the table of FIG. 8 indicate that progressive EM is actually quite competitive (in speed and scalability) with the pre-computation needed for the BRE. Nonetheless, the fitting does incur a performance penalty which may not be warranted in situations where other aspects of the algorithm described in embodiments of the invention are not beneficial (e.g., in very low-frequency illumination, or scenes with a small depth extent).

The table of FIG. 8, parameters and performance statistics for example scenes are shown. For BRE, the preprocess includes photon tracing, kd-tree and BBH construction, and radius estimation. For the method according to embodiments of the invention, this includes progressive photon shooting, GMM fitting, and hierarchy construction.

Fitting to Other Representations.

Recently, [Jarosz11] proposed the photon beams method which performs density estimation over photon path segments instead of photon points. This results in improved rendering quality compared to the BRE. However, the benefit of the method described in [Jarosz11] is actually orthogonal to embodiments of the invention. In other variations of embodiments of the invention, a Gaussian fitting pipeline could be applied in the context of photon beams as well as photon points. A straightforward combination could update statistics in all partition cells intersected by a photon beam. This could significantly improve the quality of the statistics (and the EM fit) compared to photon points. According to other embodiments of the invention, homogeneous media the statistical contributions of a beam could be evaluated analytically and plan to investigate this in future work. Another, more ambitious, avenue would be to develop a fitting procedure analogous to EM which operates more explicitly on photon beams, by clustering into higher-dimensional density distributions such as blurred 2D line segments.

Convergence and Automatic Termination.

Though the progressive EM algorithm according to embodiments of the invention is inspired by progressive photon mapping (PPM) [Hachisuka] there are important differences. According to embodiments of the invention, a method progressively fits a Gaussian mixture to photon statistics whereas PPM progressively refines radiance estimates by updating statistics at fixed measurement points. Gaussian components could be roughly interpreted as "measurement points" which not only adapt in intensity, but also location, to the underlying photon density. However, whereas PPM provides guarantees for convergence of both bias and noise, embodiments of the invention eliminate noise in the limit but is always biased since a fixed number of Gaussian terms are used. Other variations of embodiments of the invention would be to progressively split Gaussian terms when sufficient statistics indicate a single Gaussian cannot represent the underlying distribution, or to automatically deduce the required number of Gaussian terms.

Automatic termination by specifying a desired error in the image has been investigated previously in the context of PPM [Hachisuka]. While progressive EM algorithms according to embodiments of the invention also provide an automatic stopping criterion for shooting photons, this tolerance does not have an intuitive relation to the error in the image, but rather describes the convergence of the GMM fit to the underlying density distribution. Error is fairly well understood in the context of kernel-based density estimation used in photon mapping.

Hardware Example

Figure 10:
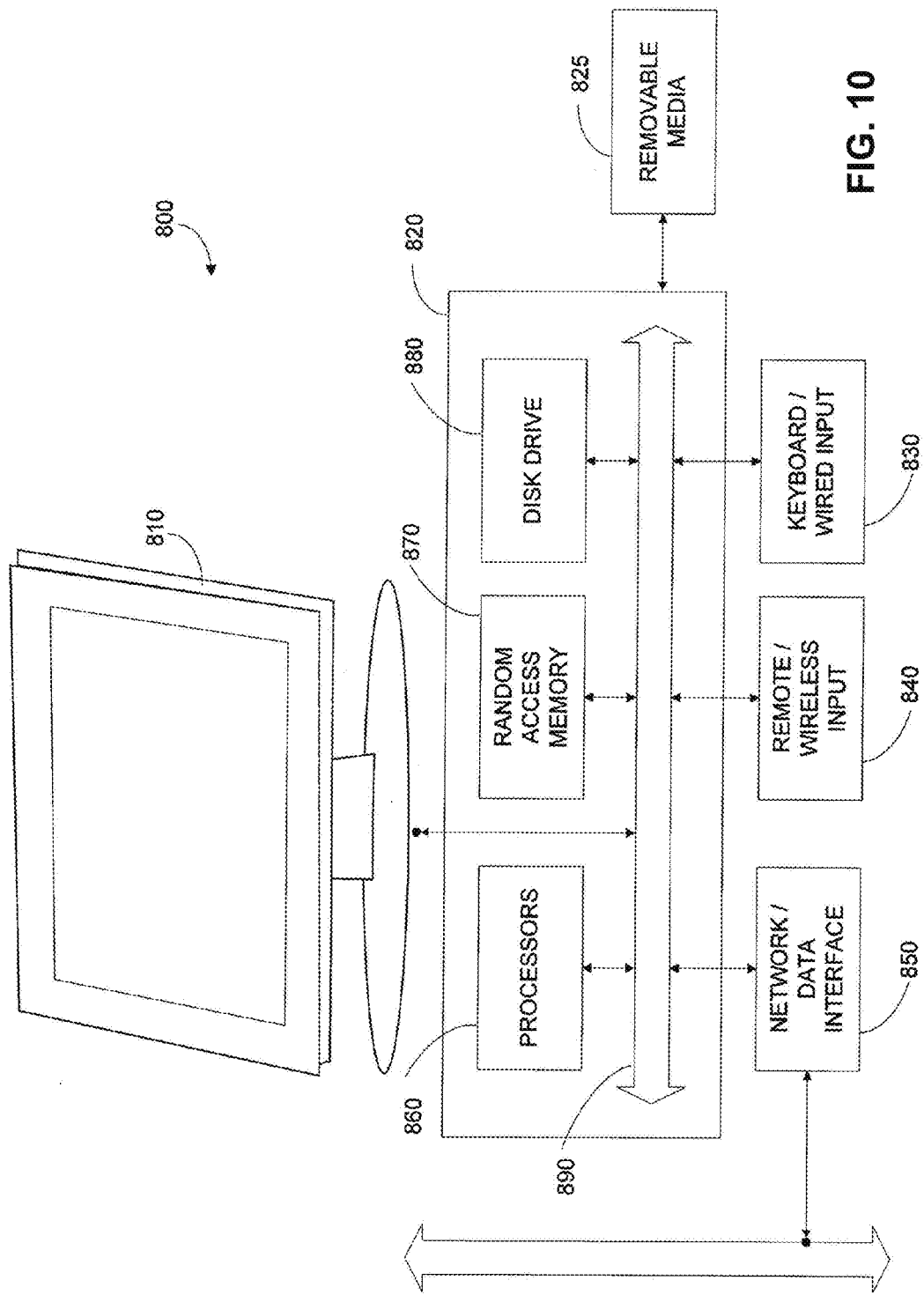
FIG. 10 illustrates an example of a hardware system that might be used for rendering.

FIG. 10 is a block diagram of hardware that might be used to implement a renderer. The renderer can use a dedicated computer system that only renders, but might also be part of a computer system that performs other actions, such as executing a real-time game or other experience with rendering images being one part of the operation.

Rendering system 800 is illustrated including a processing unit 820 coupled to one or more display devices 810, which might be used to display the intermediate images or accumulated images or final images, as well as allow for interactive specification of scene elements and/or rendering parameters. A variety of user input devices, 830 and 840, may be provided as inputs. In one embodiment, a data interface 850 may also be provided.

In various embodiments, user input device 830 includes wired connections such as a computer-type keyboard, a computer mouse, a trackball, a track pad, a joystick, drawing tablet, microphone, and the like; and user input device 840 includes wireless connections such as wireless remote controls, wireless keyboards, wireless mice, and the like. In the various embodiments, user input devices 830 and 840 typically allow a user to select objects, icons, text and the like that graphically appear on a display device (e.g., 810) via a command such as a click of a button or the like. Other embodiments of user input devices include front-panel buttons on processing unit 820.

Embodiments of data interfaces 850 typically include an Ethernet card, a modem (telephone, satellite, cable, ISDN), (asynchronous) digital subscriber line (DSL) unit, FireWire interface, USB interface, and the like. In various embodiments, data interfaces 850 may be coupled to a computer network, to a FireWire bus, a satellite cable connection, an optical cable, a wired-cable connection, or the like.

Processing unit 820 might include one or more CPU and one or more GPU. In various embodiments, processing unit 820 may include familiar computer-type components such as a processor 860, and memory storage devices, such as a random access memory (RAM) 870, disk drives 880, and system bus 890 interconnecting the above components. The CPU(s) and or GPU(s) can execute instructions representative of process steps described herein.

RAM 870 and hard-disk drive 880 are examples of tangible media configured to store data such as images, scene data, instructions and the like. Other types of tangible media includes removable hard disks, optical storage media such as CD-ROMS, DVD-ROMS, and bar codes, semiconductor memories such as flash memories, read-only-memories (ROMS), battery-backed volatile memories, networked storage devices, and the like (825).

FIG. 10 is representative of a processing unit 820 capable of rendering or otherwise generating images. It will be readily apparent to one of ordinary skill in the art that many other hardware and software configurations are suitable for use with the present invention.

For example, processing unit 820 may be a personal computer, handheld computer, server farm, or similar hardware. In still other embodiments, the techniques described below may be implemented upon a chip or an auxiliary processing board.

CONCLUSION

Embodiments of the invention have presented a progressive, hierarchical method for rendering participating media. Embodiments of the invention can be viewed as a variant of volumetric photon mapping which replaces the usual on-the-fly non-parametric density estimate with a parametric density model based on a Gaussian mixture fit to the photons. The fitting is done using a sparse and progressive form of the accelerated EM algorithm. Embodiments of the invention construct a hierarchical representation which is used to provide estimates of scattered radiance at appropriate scales during rendering. Embodiments of the invention show improved quality and temporal coherence as compared to the BRE and also supports interactive preview using splatting.

As explained herein, progressive photon beam processing can render complex illumination in participating media. It converges to the gold standard of rendering, i.e., unbiased, noise free solutions of the radiative transfer and the rendering equation, while being robust to complex light paths including SDS and SMS subpaths. Such processing can be combined with photon beams in a simple and elegant way. In each iteration of a progressive process, a global scaling factor is applied to the beam radii and reduced each pass.

Embodiments disclosed herein describe progressive photon beams, a new algorithm to render complex illumination in participating media. The main advantage of the algorithm disclosed herein is that it converges to the gold standard of rendering, i.e., unbiased, noise-free solutions of the radiative transfer and the rendering equation, while being robust to complex light paths including specular-diffuse-specular subpaths.

In some embodiments, the a parameter that controls the trade-off between reducing variance and bias is set to a constant. Some embodiments may adaptively determine this parameter to optimize convergence.

While heterogeneous media can be incorporated into this approach in a straightforward way using ray marching along the beams, extensions of this brute force approach that may be more computationally efficient. Some embodiments assume that photons are sampled using independent, identically distributed random variables. Some embodiments may include adaptive algorithms such as Markov Chain Monte Carlo and adaptive importance sampling.

Further embodiments can be envisioned to one of ordinary skill in the art after reading the attached documents. For example, photons can be sampled in various manners. In other embodiments, combinations or sub-combinations of the above disclosed embodiments can be advantageously made. The block diagrams of the architecture and flow charts are grouped for ease of understanding. However it should be understood that combinations of blocks, additions of new blocks, rearrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented rendering method for rendering an image of a scene, the rendering method performed in a rendering system that includes one or more processors, the rendering method comprising:
  receiving electronically readable representative data corresponding to one or more objects in a computer-generated imagery ("CGI") scene of a virtual space;
  determine a first partition of cells of the one or more objects;
  for each of a plurality of progressive iterations:
    performing a photon simulation of a lighting distribution of the one or more objects using a respective set of photons;
    temporarily storing the respective set of photons in a memory;
    for each of a plurality of cells of the first partition:
      calculating statistics of the photons in the cell for the current iteration and any previous iterations using the respective set of photons and the calculated statistics from a previous iteration;
      fitting an initial mixture of density functions to the calculated statistics of the current iteration; and
      evicting from the memory the respective set of photons, wherein the iterations are performed until the initial mixture of density functions satisfy one or more criteria for fitting the calculated statistics; and
    rendering an image of the CGI scene using the initial mixture of density functions.

2. The method of claim 1, wherein the density functions are Gaussian functions.

3. The method of claim 2, wherein the Gaussian functions are anisotropic.

4. The method of claim 2, wherein fitting the initial mixture of Gaussian functions to the calculated statistics of the current iteration includes:
  skipping a contribution of a first cell of the first partition to a first Gaussian function based on spatial distance and a user-specified relative error tolerance.

5. The method of claim 1, wherein fitting the initial mixture of density functions to the calculated statistics of the current iteration uses expectation-maximization.

6. The method of claim 1, the method further comprising:
  merging the density functions of the initial mixture to obtain a lower-resolution mixture of density functions, wherein the initial mixture uses more density functions than the lower-resolution mixture; and
  determining which density functions of the initial mixture and the lower-resolution mixture to use to render the image.

7. The method of claim 6, further comprising:
  using at least a portion of the initial mixture of density functions and at least a portion of the lower-resolution mixture of density functions to render the image.

8. The method of claim 6, further comprising:
  for each of a plurality of mixtures of density functions:
    merging density functions of a current mixture of density functions to successively obtain mixtures of density functions of lower resolution, thereby creating a hierarchy of mixtures of density functions having successively fewer density functions; and
  determining which density functions of each mixture of density functions of the hierarchy to render the image.

9. The method of claim 8, further comprising:
  using at least a portion of each mixture of density functions of the hierarchy to render the image.

10. The method of claim 8, further comprising:
  forming a bounding box around a plurality of the density functions;
  identifying a first pixel of the image;
  determining a query ray from the first pixel;
  identifying bounding boxes of density functions of the hierarchy of mixtures of density functions through which the query ray passes;
  determining which density functions to use for calculating a first radiance estimate for the first pixel based on the identified bounding boxes, the radiance estimate used to render the image.

11. The method of claim 10, wherein determining which density functions to use further includes:
  determining a solid angle of the query ray for a first bounding box of a first density function; and
  comparing the solid angle to a first threshold to determine whether to use the first density function or a density function of a mixture of higher resolution in rendering the image.

12. The method of claim 11, further comprising:
  when the solid angle is equal to or greater than the threshold, computing a transmittance between an origin of the query ray and a first hit point with the first bounding box;
  comparing the transmittance to a second threshold;
  using a density function of a mixture of higher resolution when the transmittance is equal to or greater than the second threshold, and otherwise using the first density function in rendering the image.

13. The method of claim 12, further comprising:
  for each pixel in the image:
    determining a query ray; and
    using the query ray to determine which density functions to use for calculating a radiance estimate for the pixel.

14. The method of claim 6, wherein merging the density functions of the initial mixture includes:
  calculating a distance between two density functions using a symmetric dissimilarity function; and
  using the distance to combine the two density functions.

15. The method of claim 14, wherein the distance is computed using Kullback-Leibler divergence.

16. The method of claim 6, wherein a mixture of density functions is defined by a set of parameters, wherein fitting the initial mixture of density functions to the calculated statistics of the current iteration includes:
calculating a first set of parameters using statistics of a second partition that is more coarse than the first partition; and
using the first set of parameters to determine a second set of parameters, the second set of parameters providing the fit of the initial mixture of density functions to the calculated statistics of the current iteration.

17. The method of claim 16, further comprising:
computing the statistics of the second partition from the statistics of the first partition.

18. A non-transitory computer-readable medium comprising code capable of being executed by a computer system having one or more processors to perform a computer-implemented rendering method for rendering an image of a scene, the rendering method comprising:
receiving electronically readable representative data corresponding to one or more objects in a computer-generated imagery ("CGI") scene of a virtual space;
determine a first partition of cells of the one or more objects;
for each of a plurality of progressive iterations:
performing a photon simulation of a lighting distribution of the one or more objects using a respective set of photons;
temporarily storing the respective set of photons in a memory;
for each cell of the first partition:
calculating statistics of the photons in the cell for the current iteration and any previous iterations using the respective set of photons and the calculated statistics from a previous iteration;
fitting an initial mixture of density functions to the calculated statistics of the current iteration; and
evicting from the memory the respective set of photons, wherein the iterations are performed until the initial mixture of density functions satisfy one or more criteria for fitting the calculated statistics; and
rendering an image of the CGI scene using the initial mixture of density functions.

19. The computer-readable medium of claim 18, wherein the density functions are Gaussian functions, wherein the Gaussian functions are anisotropic, and wherein fitting the initial mixture of Gaussian functions to the calculated statistics of the current iteration includes:
skipping a contribution of a first cell of the first partition to a first Gaussian function based on spatial distance and a user-specified relative error tolerance.

20. The computer-readable medium of claim 18, wherein fitting the initial mixture of density functions to the calculated statistics of the current iteration uses expectation-maximization.

21. The computer-readable medium of claim 18, the rendering method further comprising:
merging the density functions of the initial mixture to obtain a lower-resolution mixture of density functions, wherein the initial mixture uses more density functions than the lower-resolution mixture; and
determining which density functions of the initial mixture and the lower-resolution mixture to use to render the image.

22. The computer-readable medium of claim 21, the rendering further comprising:
for each of a plurality of mixtures of density functions:
merging density functions of a current mixture of density functions to successively obtain mixtures of density functions of lower resolution, thereby creating a hierarchy of mixtures of density functions having successively fewer density functions; and
determining which density functions of each mixture of density functions of the hierarchy to render the image.

23. The computer-readable medium of claim 22, the rendering further comprising:
forming a bounding box around a plurality of the density functions;
identifying a first pixel of the image;
determining a query ray from the first pixel;
identifying bounding boxes of density functions of the hierarchy of mixtures of density functions through which the query ray passes;
determining which density functions to use for calculating a first radiance estimate for the first pixel based on the identified bounding boxes, the radiance estimate used to render the image.

24. The computer-readable medium of claim 23, wherein determining which density functions to use further includes:
determining a solid angle of the query ray for a first bounding box of a first density function; and
comparing the solid angle to a first threshold to determine whether to use the first density function or a density function of a mixture of higher resolution in rendering the image.

25. The computer-readable medium of claim 24, the rendering further comprising:
when the solid angle is equal to or greater than the threshold, computing a transmittance between an origin of the query ray and a first hit point with the first bounding box;
comparing the transmittance to a second threshold;
using a density function of a mixture of higher resolution when the transmittance is equal to or greater than the second threshold, and otherwise using the first density function in rendering the image.

26. The computer-readable medium of claim 21, wherein merging the density functions of the initial mixture includes:
calculating a distance between two density functions using a symmetric dissimilarity function; and
using the distance to combine the two density functions.

27. The computer-readable medium of claim 21, wherein a mixture of density functions is defined by a set of parameters, wherein fitting the initial mixture of density functions to the calculated statistics of the current iteration includes:
calculating a first set of parameters using statistics of a second partition that is more coarse than the first partition;
computing the statistics of the second partition from the statistics of the first partition; and
using the first set of parameters to determine a second set of parameters, the second set of parameters providing the fit of the initial mixture of density functions to the calculated statistics of the current iteration.

* * * * *